United States Patent
Ochi

(10) Patent No.: US 8,811,133 B2
(45) Date of Patent: Aug. 19, 2014

(54) WRITING SYSTEM, WRITING DEVICE, AND WRITING METHOD

(71) Applicant: Fujitsu Limited, Kawasaki (JP)

(72) Inventor: Yoshiaki Ochi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/751,308

(22) Filed: Jan. 28, 2013

(65) Prior Publication Data

US 2013/0194904 A1    Aug. 1, 2013

(30) Foreign Application Priority Data

Feb. 1, 2012 (JP) ................................ 2012-019670

(51) Int. Cl.
  *G11B 15/24* (2006.01)
  *G11B 20/18* (2006.01)
  *G11B 7/085* (2006.01)

(52) U.S. Cl.
  USPC .............. 369/47.11; 369/30.07; 369/132; 369/30.25; 369/53.37; 369/30.23; 720/732; 360/99.13; 360/99.14; 360/132

(58) Field of Classification Search
  USPC .............. 369/13.16, 13.25, 13.36, 13.37, 20, 369/29.02, 30.04–30.06, 30.07, 30.09, 369/30.18, 30.2, 30.23–30.25, 30.27–30.42, 369/30.65–30.68, 30.7, 30.81–30.83, 32.01, 369/33.01, 44.27–47.55, 53.16, 53.24, 369/53.44, 70, 76, 77.21, 128, 178.01, 253, 369/256, 53.37, 30.21–30.24; 360/53, 54, 360/63, 64, 71, 98.01, 98.04, 98.05, 98.06, 360/99.03, 99.13, 99.14, 99.15, 132; 720/615, 616–619, 632, 656, 725, 728, 720/732–734
  See application file for complete search history.

(56) References Cited

U.S. PATENT DOCUMENTS

| 5,546,533 | A | 8/1996 | Koyama | |
|---|---|---|---|---|
| 2010/0005239 | A1* | 1/2010 | Hur et al. | 711/112 |
| 2011/0176238 | A1* | 7/2011 | Shiratori et al. | 360/72.1 |
| 2012/0014234 | A1* | 1/2012 | Ho et al. | 369/30.23 |

FOREIGN PATENT DOCUMENTS

| JP | 6-175792 | 6/1994 |
|---|---|---|
| JP | 6-175793 | 6/1994 |
| JP | 9-161452 | 6/1997 |
| JP | 2003-263840 | 9/2003 |
| JP | 2011-146105 | 7/2011 |

* cited by examiner

*Primary Examiner* — Wayne Young
*Assistant Examiner* — Dionne Pendleton
(74) *Attorney, Agent, or Firm* — Staas & Halsey LLP

(57) ABSTRACT

A writing-system comprises a first and a second writing-device, and is connected to an information-processor-apparatus that obtains unwritten-data from the first and the second writing-devices when a notification is received, the notification indicating that the unwritten-data is generated while writing data on a recording-medium used by either of the writing-devices, wherein the first writing-device comprises a first writing-unit, when the unwritten-data is generated while writing data on a recording-medium, transmits to the information-processor-apparatus, dummy information for inhibiting the unwritten-data to be obtained by the information-processor-apparatus, and writes the unwritten-data to a memory-unit, the recording-medium and the memory-unit are included in a cartridge accommodated in the first writing-device, and the second writing-device comprises a second writing-unit that writes, on the recording-medium, the unwritten-data stored in the memory-unit when the cartridge is moved from the first writing-device to the second writing-device.

8 Claims, 19 Drawing Sheets

FIG. 6

| BYTE | 0 | 1 | 2 | 3 | 4 | 5 | 6 | 7 | BIT | |
|---|---|---|---|---|---|---|---|---|---|---|
| 0 | BID AT WRITING FAILURE ||||||||| 0x00 |
| 1 | BID AT WRITING FAILURE ||||||||| 0x00 |
| 2 | BID AT WRITING FAILURE ||||||||| 0x00 |
| 3 | BID AT WRITING FAILURE ||||||||| 0x02 |
| 4 | AMOUNT OF UNWRITTEN DATA ||||||||| 0x00 |
| 5 | AMOUNT OF UNWRITTEN DATA ||||||||| 0x03 |
| 6 | SPARE ||||||||| SPARE |
| 7 | SPARE ||||||||| SPARE |

421      421a

FIG. 12
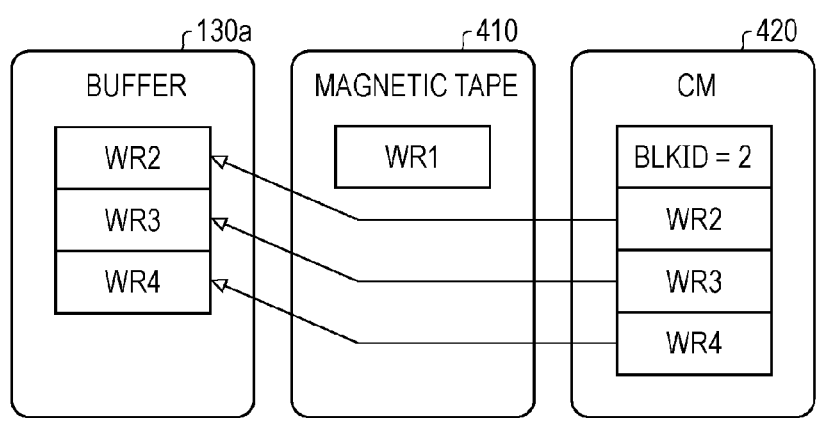
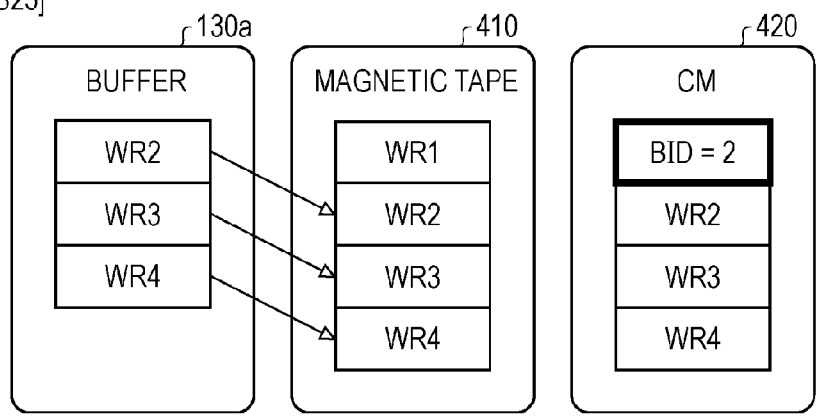

FIG. 14
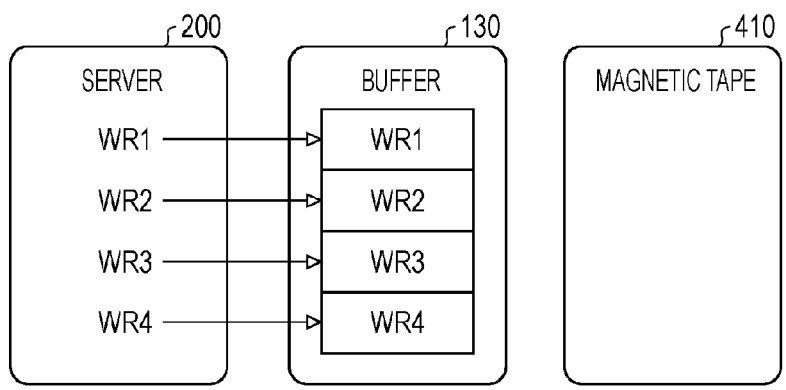
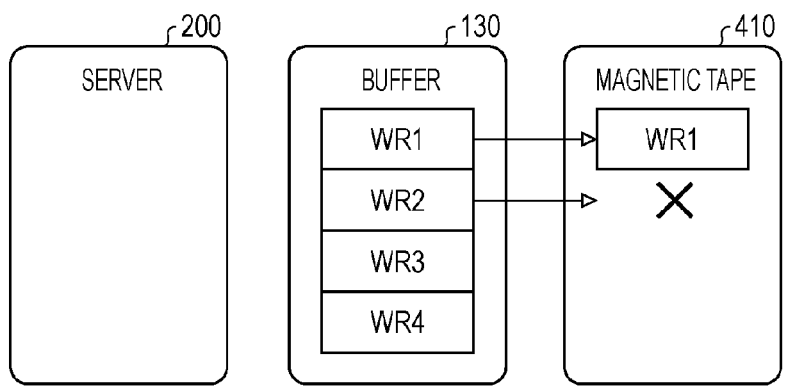
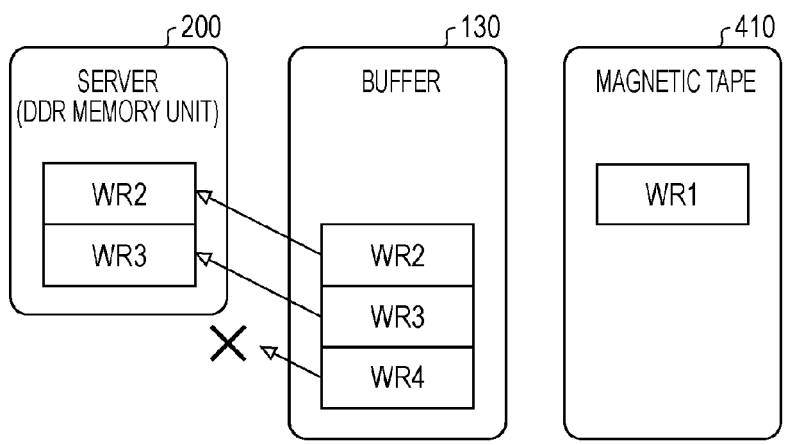

WRITING SYSTEM, WRITING DEVICE, AND WRITING METHOD

CROSS-REFERENCE TO RELATED APPLICATION

This application is based upon and claims the benefit of priority of the prior Japanese Patent Application No. 2012-019670, filed on Feb. 1, 2012, the entire contents of which are incorporated herein by reference.

FIELD

The embodiments discussed herein relate to a writing system, a writing device and a writing method.

BACKGROUND

Writing devices are used to record data handled by information processor apparatuses such as a computers on recording media that may be taken out of the information processor apparatuses. For example, recording media with data written thereon are saved and kept as backups of the data. An electromagnetic tape medium or an optical disk medium and the like may be used as the recording media. The recording media may be accommodated inside cases called cartridges for convenient handling.

However, writing data on a recording medium may fail due to an abnormality and the like in the writing device. Thus, methods to allow the continuation of data writing even when a writing failure occurs have been considered.

For example, there is a proposal that includes providing a backup memory in an optical disk medium, storing write data on the disk medium also into the backup memory so that the data may be recovered from the backup memory when a data writing error occurs.

For example, there is another proposal that includes a method called dynamic device reconfiguration (DDR) for writing data on an electromagnetic tape medium. When an error occurs in an electromagnetic tape device while data is being written on the electromagnetic tape device, the electromagnetic tape device reports the error to a host device. The host device saves unwritten data that has been backed up at the electromagnetic tape device side to a main memory in the host device. The host device instructs an operator to move the electromagnetic tape medium to another normal electromagnetic tape device. The operator moves the electromagnetic tape medium to the other normal electromagnetic tape device. The host device then uses the other electromagnetic tape device to add the saved unwritten data on the electromagnetic tape medium. In this way, data writing on an electromagnetic tape medium continues even if an error occurs in DDR.

There is a proposal in which a non-volatile memory is provided in a cartridge containing an electromagnetic tape medium, and partition information of the electromagnetic tape medium and user information and the like is stored in the non-volatile memory. There is also a proposal in which a non-volatile memory unit is provided in an electromagnetic tape medium cartridge and data written in the memory unit is rewritten to a position specified on the electromagnetic tape medium.

Japanese Patent Laid-open No. 6-175793, Japanese Patent Laid-open No. 2003-263840, Japanese Patent Laid-open No. 6-175792, Japanese Patent Laid-open No. 9-161452, and Japanese Laid-open Patent 2011-146105 are examples of related art.

When unwritten data is saved to a host device as in DDR, the size of the storage area for saving may be small in comparison to the size of the data to be saved. In this case, the data writing may be interrupted without being able to save all of the unwritten data. Thus, increasing the size of the storage area for saving in the host device may be considered. However, it may be difficult to properly secure a storage area for saving on the host device side when the host device is operating or when storage areas are assigned from the main storage device to other devices.

Accordingly, providing a memory in an electromagnetic tape medium cartridge to allow the use of a storage area in the memory for saving may be considered. However, in this case, incorporating a procedure for saving and writing data using a memory in a cartridge may lead to problems in suppressing costs with respect to existing DDR procedures in the host device.

For example, in a host device DDR procedure, remaking an unwritten data saving destination to use as a memory in a cartridge instead of a main storage device on the host device side incurs man-hours for conducting the remaking. Moreover, changing an existing procedure on a host device that is operating in a stable manner may also lead to the problem of incurring man-hours for careful preparation and actual work when considering the effect on other existing operating procedures.

An aspect of the embodiments discussed herein is to provide a writing system, a writing device, and a writing method that allow for the expansion of storage areas for saving data at a low cost.

SUMMARY

According to an aspect of the application, a writing system comprises a first and a second writing device, and is connected to an information processor apparatus that obtains unwritten data from the first and the second writing devices when a notification is received, the notification indicating that the unwritten data is generated while writing data on a recording medium used by either of the writing devices. Wherein, the first writing device comprises a first writing unit, when the unwritten data is generated while writing data on a recording medium, transmits to the information processor apparatus, dummy information for inhibiting the unwritten data to be obtained by the information processor apparatus, and writes the unwritten data to a memory unit, the recording medium and the memory unit are included in a cartridge accommodated in the first writing device. And the second writing device comprises a second writing unit that writes, on the recording medium, the unwritten data stored in the memory unit when the cartridge is moved from the first writing device to the second writing device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a control table according to the second embodiment;

FIG. 12 illustrates a specific example of post-processing when an error occurs according to the second embodiment;

FIG. 14 is a comparative example of processing when a writing error occurs;

DESCRIPTION OF EMBODIMENTS

Hereinafter, the present embodiment is explained with reference to the drawings.

First Embodiment

Figure 1:
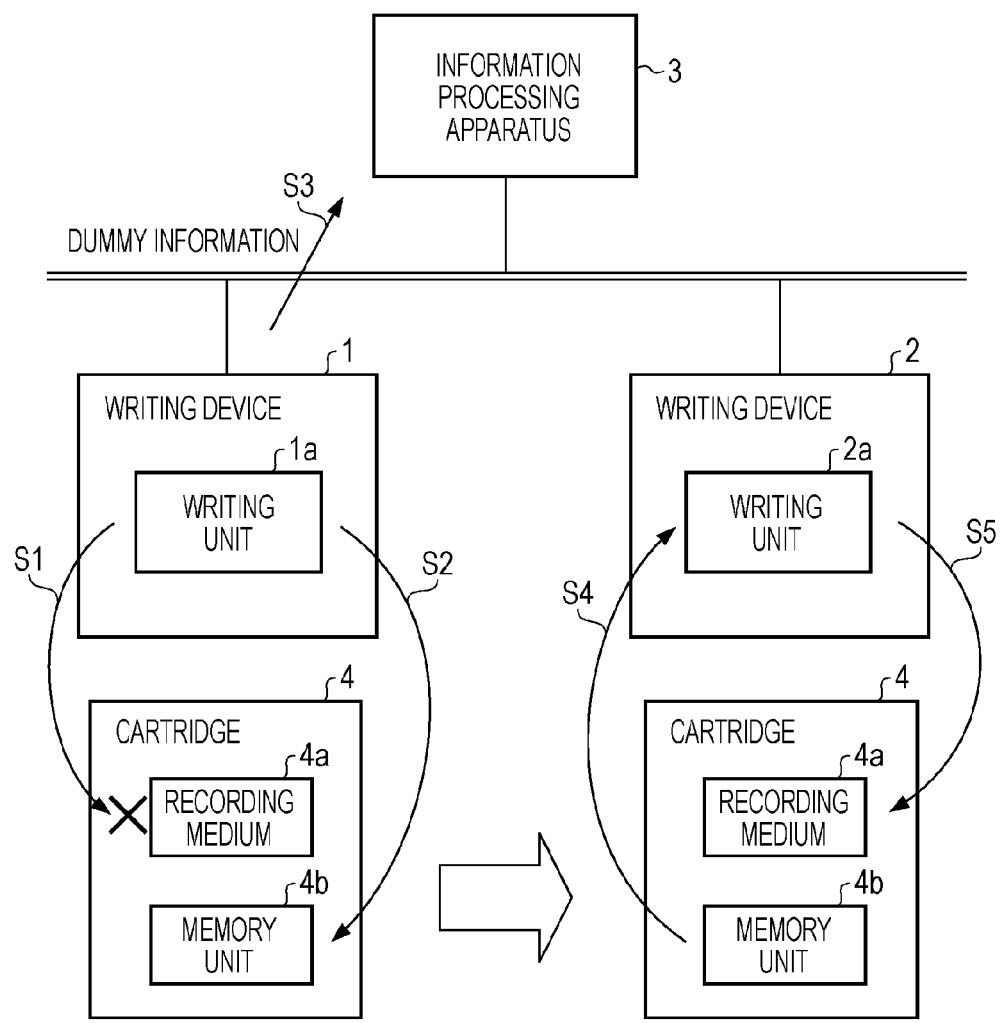
FIG. 1 illustrates a writing system according to a first embodiment.

FIG. 1 illustrates a writing system according to a first embodiment. The writing system according to the first embodiment includes writing devices 1 and 2. The writing system according to the first embodiment is connected to an information processor apparatus 3. The information processor apparatus 3 may be a host device for the writing devices 1 and 2. The writing devices 1 and 2 perform writing of data for outputting to the information processor apparatus 3 on a recording medium 4a in a cartridge 4 that is accommodated in each of the writing devices 1 and 2. The writing devices 1 and 2 store the data for outputting to the information processor apparatus 3 in their respective buffers. The writing devices 1 and 2 write the data stored in their respective buffers on the recording mediums 4a.

The information processor apparatus 3 receives a notification of the occurrence of unwritten data from the writing device 1 when data is being written on the recording medium 4a used by the writing device 1. The information processor apparatus 3 then obtains from the writing device 1 the unwritten data that has been buffered, and holds the unwritten data in a certain save area in a main storage device in the information processor apparatus 3. The information processor apparatus 3 instructs an operator to move the cartridge 4 to the writing device 2. The information processor apparatus 3 writes the unwritten data held in its own save area on the recording medium 4a of the cartridge 4 used by the writing device 2. This method is called DDR.

The cartridge 4 includes the recording medium 4a and a memory unit 4b. The recording medium 4a has a larger storage area size than the memory unit 4b and is able to store a large amount of data. The recording medium 4a may be, for example, an electromagnetic tape medium. The memory unit 4b is a memory unit provided on a medium that differs from the recording medium 4a. The memory unit 4b is a storage area for saving unwritten data when unwritten data is generated on the recording medium 4a due to a failure and the like of the writing device 1 or 2. The memory unit 4b may be, for example, a semiconductor memory.

The writing device 1 has a writing unit 1a. The writing unit 1a writes unwritten data to the memory unit 4b when unwritten data is generated while writing data on the recording medium 4a. At this time, the writing unit 1a transmits dummy information to the information processor apparatus 3 so that the unwritten data is not obtained by the information processor apparatus 3.

The dummy information is information that does not inhibit the existing processing performed by the information processor apparatus 3. For example, the dummy information is information that notifies the fact that unwritten data is not generated. Alternatively, after notifying the information processor apparatus 3 about the generation of unwritten data, certain data that is smaller in size than the unwritten data may be transmitted as the dummy information when the information processor apparatus 3 attempts to obtain the unwritten data. In this case, the information processor apparatus 3 receives the dummy information instead of the unwritten data.

The writing device 2 has a writing unit 2a. The second writing unit 2a writes the unwritten data stored in the memory unit 4b on the recording medium 4a when the cartridge is moved from the writing device 1 to the writing device 2.

The information processor apparatus 3 then uses the writing device 2 to restart normal writing on the recording medium 4a. The writing device 2 may notify the information processor apparatus 3 about the fact that continuation of the writing is possible after the writing of the unwritten data on the recording medium 4a is completed. In this case, the information processor apparatus 3 receives the notification and is able to restart normal writing.

According to the writing system of the first embodiment, when unwritten data is generated while the writing unit is writing data on the recording medium 4a in the cartridge 4 (operation S1), the unwritten data is written to the memory unit 4b (operation S2). At this time, dummy information is sent to the information processor apparatus 3 by the writing unit is (operation S3). The unwritten data is not obtained by the information processor apparatus 3 due to the sending of the dummy information. When the cartridge 4 is moved from the writing device 1 to the writing device 2, the unwritten data stored in the memory unit 4b is obtained by the writing unit 2a (operation S4) and written on the recording medium 4a (operation S5).

As a result, the storage area for saving data may be expanded at a low cost. Specifically, the writing device 1 curbs the acquisition of the unwritten data by the information processor apparatus 3 by transmitting the dummy information to the information processor apparatus 3. As a result, the data saving procedure included in the DDR procedures performed by the information processor apparatus 3 may be limited to a portion of the processing. The saving of the unwritten data using the writing devices 1 and 2 and the writing of unwritten data on the recording medium 4a may be performed independently from the information processor apparatus 3. In this way, the memory unit 4b provided in the cartridge 4 may be easily used as a storage area for saving data. In particular, costs that may be generated by expanding the storage area are suppressed since the existing DDR procedures of the information processor apparatus 3 may be carried out without remaking the procedures.

Second Embodiment

Figure 2:
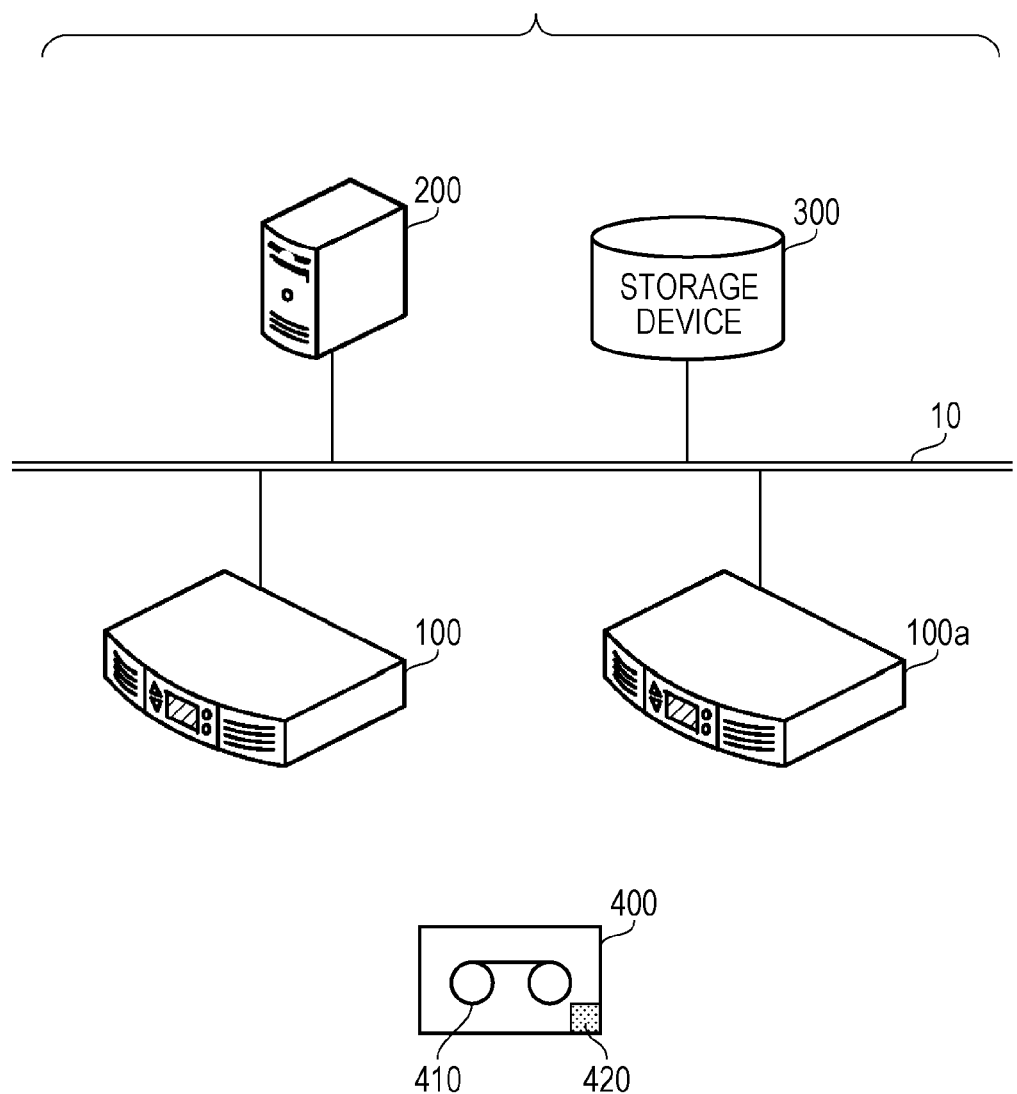
FIG. 2 illustrates an information processing system according to a second embodiment.

FIG. 2 illustrates an information processing system according to a second embodiment. The information processing system according to the second embodiment includes tape devices 100 and 100a, a server 200, and a storage device 300. The tape devices 100 and 100a and the storage device 300 are connected to a network 10. The network 10 is, for example, a storage area network (SAN) that uses Ethernet (trademark) or a fiber channel (FC) and the like.

The tape devices 100 and 100a are writing devices that write data on a recording medium accommodated in a cartridge 400. The tape devices 100 and 100a may be devices called library devices or changer devices that store a plurality of cartridges 400 inside a housing.

Here, the cartridge 400 includes an electromagnetic tape 410 and a cartridge memory (CM) 420. The electromagnetic tape 410 is an electromagnetic tape medium. The electromagnetic tape 410 is larger in size than the CM 420 and is able to store a large amount of data. Backups of data handled by the server 200 are, for example, stored on the electromagnetic tape 410. The CM 420 is a semiconductor memory. The CM 420 is used for saving data.

The tape devices 100 and 100a and the electromagnetic tape 410 may comply with standards such as, for example, Linear Tape Open (LTO, trademark), Digital Linear Tape (DLT, trademark), Advanced Intelligent Tape (AIT, trademark), or Digital Data Storage (DDS, trademark).

For example, a storage area of 1.6 terabytes of the entire electromagnetic tape 410 may be used in LTO-5. Conversely, a storage area of several gigabytes to several tens of gigabytes may be used, for example, as the CM 420.

The server 200 is a server computer that provides certain services for other server devices or client devices (not illustrated) and the like. The server 200 uses the tape devices 100 and 100a to perform backups of data stored in the server 200 itself or in the storage device 300. The server 200 herein includes DDR functionality. The server 200 may also be called a host computer that executes procedures for inputting from a terminal device.

The storage device 300 is a storage device for storing data used in processing by the server 200. For example, if the server 200 functions as a database (DB) server, the body of the DB is stored in the storage device 300.

Figure 3:
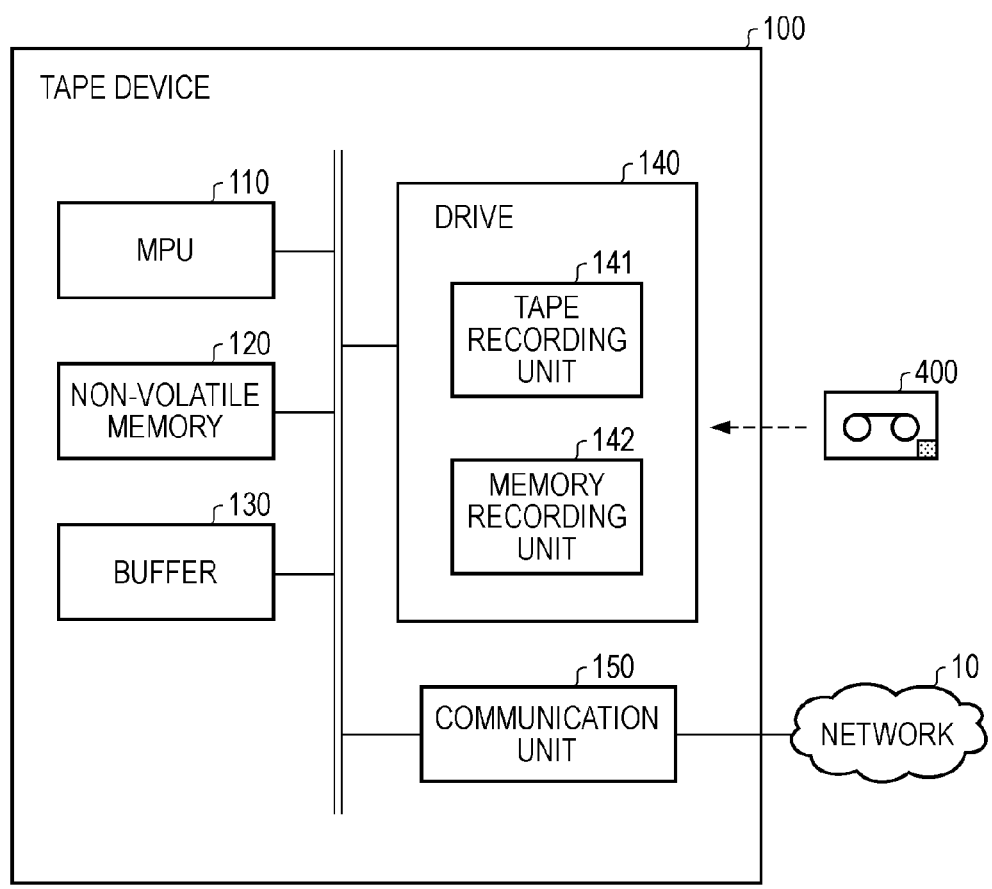
FIG. 3 is an example of hardware of a tape device according to the second embodiment.

FIG. 3 is an example of hardware of a tape device according to the second embodiment. The tape device 100 has a micro processing unit (MPU) 110, a non-volatile random access memory (NVRAM) 120, a buffer 130, a drive 140, and a communication unit 150. The units are connected to a bus in the tape device 100.

The MPU 110 is a processor that controls the information processing of the tape device 100. The non-volatile memory 120 stores firmware programs executed by the MPU 110. The non-volatile memory 120 also stores data used in processing by the MPU 110.

The buffer 130 is a storage area for temporarily storing data to be written that is obtained from the server 200. The drive 140 is able to accommodate the cartridge 400. The drive 140 is able to read data from and write data to the accommodated cartridge 400 according to commands from the MPU 110. The drive 140 has a tape recording unit 141 and a memory recording unit 142. The tape recording unit 141 reads data from and writes data on the electromagnetic tape 410. The memory recording unit 142 reads data from and writes data to the CM 420.

Figure 4:
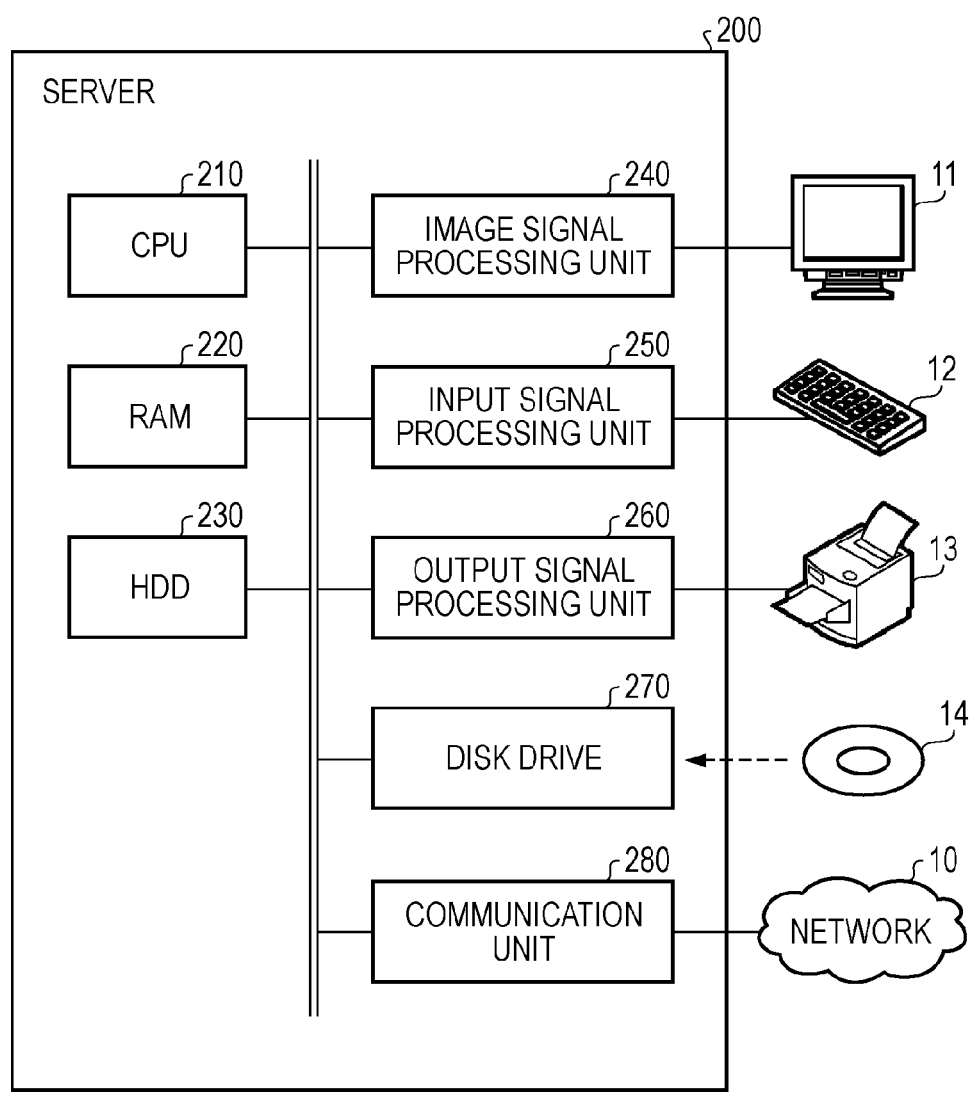
FIG. 4 illustrates an example of hardware of a server according to the second embodiment.

The communication unit 150 is a communication interface that conducts communication with the server 200 through the network 10. FIG. 4 is an example of hardware of a server according to the second embodiment. The server 200 includes a central processing unit (CPU) 210, a random access memory (RAM) 220, a hard disk drive (HDD) 230, an image signal processing unit 240, an input signal processing unit 250, an output signal processing unit 260, a disk drive 270, and a communication unit 280. The units are connected to a bus in the server 200.

The CPU 210 is a processor that controls the information processing of the server 200. The CPU 210 reads at least a portion of the programs and data stored in the HDD 230 and develops and executes programs in the RAM 220.

The RAM 220 is a volatile memory that temporarily stores data for processing and programs run by the CPU 210. The HDD 230 is a non-volatile storage device that stores data and programs such as operating system (OS) programs and application programs. The HDD 230 reads data from a built-in magnetic disc in accordance with commands from the CPU 210.

The image signal processing unit 240 outputs images to a display 11 connected to the server 200 in accordance with commands from the CPU 210. For example, a cathode ray tube (CRT) display or a liquid crystal display and the like may be used as the display 11.

The input signal processing unit 250 obtains input signals from an input device 12 connected to the server 200 and outputs the input signals to the CPU 210. A keyboard or a pointing device such as a mouse or a touch panel, for example, may be used as the input device 12.

The output signal processing unit 260 obtains output signals from the CPU 210 and outputs the input signals to an output device 13 connected to the server 200. For example, a printer may be used as the output device 13.

The disk drive 270 is a drive device for reading data and programs stored on a recording medium 14. For example, a magnetic disc such as a flexible disk (FD) or an HDD, an optical disk such as a compact disc (CD) or a digital versatile disc (DVD), or a magneto-optical disk (MO) may be used as the recording medium 24 handled by the disk drive 270. The disk drive 270 stores, for example, data and programs read from the recording medium 14 to the RAM 220 or the HDD 230 according to commands from the CPU 210.

Figure 5:
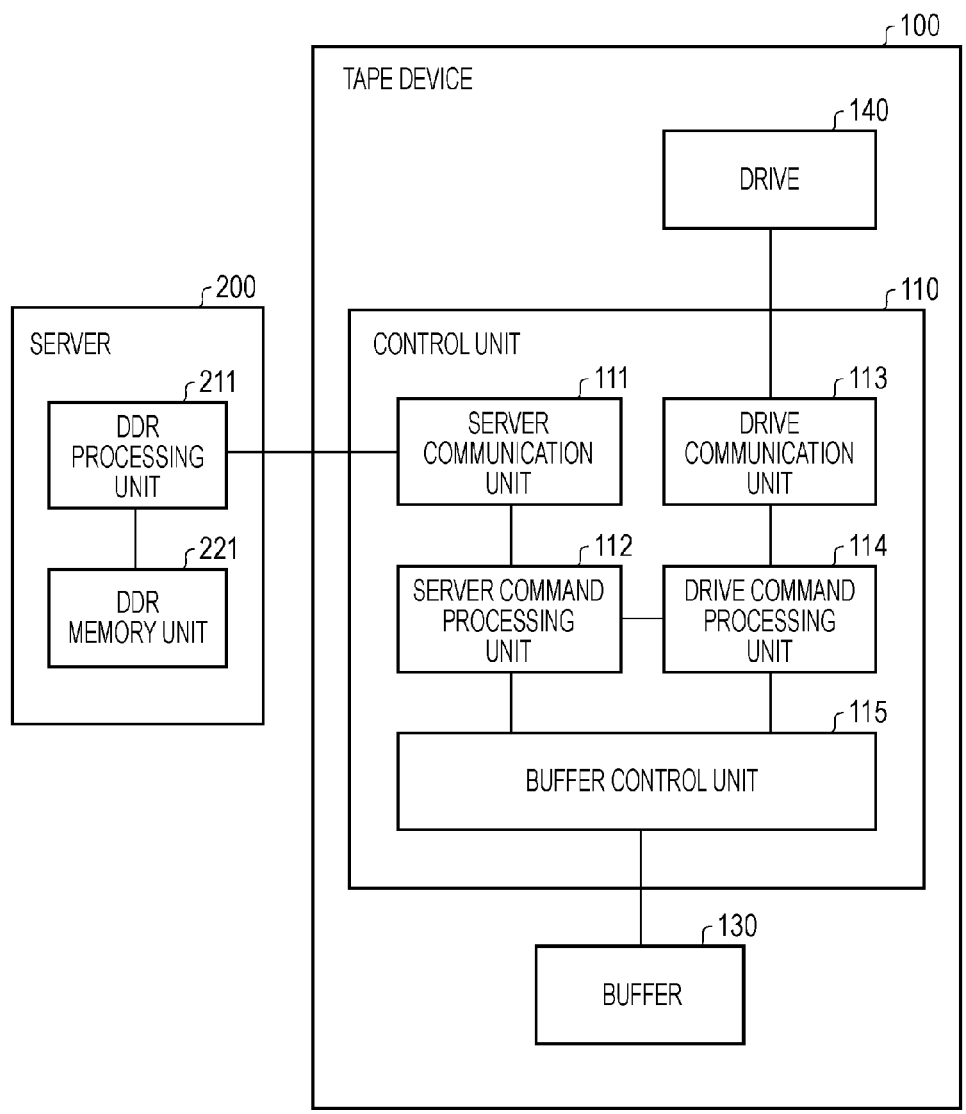
FIG. 5 illustrates an example of software according to the second embodiment.

The communication unit 280 is a communication interface that performs communication with the tape devices 100 and 100a through the network 10. FIG. 5 illustrates an example of software according to the second embodiment. All of or a portion of the units illustrated in FIG. 5 may be modules of programs executed by the tape device 100 and the server 200. Additionally, all of or a portion of the units illustrated in FIG. 5 may be electronic circuits such as an application specific integrated circuit (ASIC) or a field programmable gate array (FPGA). The tape device 100a and the tape device 100 may be installed and used in the same unit.

The tape device 100 includes a server communication unit 111, a server command processing unit 112, a drive communication unit 113, a drive command processing unit 114, and a buffer control unit 115. The server communication unit 111 communicates with the server 200. The server communication unit 111 outputs commands received from the server 200 to the server command processing unit 112.

The server command processing unit 112 executes processing in response to commands obtained from the server communication unit 111. For example, when a data writing command is obtained, the server command processing unit 112 stores the data to be written in the buffer 130 and sends a reply to the server 200 indicating that the writing is completed. The operation of the buffer 130 by the server command processing unit 112 is performed via the buffer control unit 115. The data written to the buffer 130 is written on the electromagnetic tape 410 by the drive command processing unit 114. Communication between the server command processing unit 112 and the server 200 is conducted via the server communication unit 111. Moreover, for example, when a data reading command is received from the electromagnetic tape 410, the server command processing unit 112 causes the drive command processing unit 114 to read the data stored in the electromagnetic tape 410 and to store the data in the buffer 130. The server command processing unit 112 sends a reply to the server 200 indicating that the data is stored in the buffer 130. In this way, the writing of data from the server 200 on the electromagnetic tape 410 is performed via the buffer 130. Similarly, the reading of data from the electromagnetic tape 410 by the server 200 is performed via the buffer 130.

The drive communication unit 113 communicates with the drive 140. The drive communication unit 113 monitors the state of the drive 140. The drive communication unit 113 notifies the drive command processing unit 114 about an error when an abnormality occurs in the operation of the tape recording unit 141 while writing data on the electromagnetic tape 410 which leads to a writing failure.

The drive command processing unit 114 executes reading and writing with regard to the electromagnetic tape 410 in response to data writing and reading instructions from the server command processing unit 112. The drive command processing unit 114 stores data read from the electromagnetic tape 410 in the buffer 130. Communication between the drive command processing unit 114 and the drive 140 is conducted via the drive communication unit 113. The operation of the buffer 130 by the drive command processing unit 114 is performed via the buffer control unit 115.

The drive command processing unit 114 notifies the server command processing unit 112 and the buffer control unit 115 about the error when an error notification is received from the drive communication unit 113. The server command processing unit 112 that receives the error notification transmits the fact of the occurrence of the error to the server 200.

Furthermore, the drive command processing unit 114 writes data to the CM 420 according to instructions from the buffer control unit 115. Here, the data written to the CM 420 is data that is unwritten (referred to below as "unwritten data") and remaining in the buffer 130 at the time the failure occurs. The drive command processing unit 114 also reads the unwritten data stored in the CM 420 and stores the unwritten data in the buffer 130. The drive command processing unit 114 writes the unwritten data stored to the buffer 130 to the electromagnetic tape 410.

The buffer control unit 115 performs reading and writing of data with regard to the buffer 130 according to instructions from the server command processing unit 112 and the drive command processing unit 114. The buffer control unit 115 instructs the drive command processing unit 114 to write the unwritten data stored (written) to the buffer 130 to the CM 420 when an error notification is received from the drive command processing unit 114.

The server 200 has a DDR processing unit 211 and a DDR memory unit 221. The DDR processing unit 211 controls the DDR processing according to the server 200. Specifically, the DDR processing unit 211 instructs the tape device 100 to provide the unwritten data when an error notification and the fact that unwritten data was generated are received from the tape device 100. The DDR processing unit 211 stores the unwritten data obtained from the tape device 100 in the DDR memory unit 221. Next, the DDR processing unit 211 instructs an operator to move the cartridge 400 contained in the tape device 100 to the tape device 100a. The DDR processing unit 211 uses the tape device 100a to write the unwritten data stored in the DDR memory unit 221 on the electromagnetic tape 410 when the cartridge 400 is moved to the tape device 100a. The DDR processing unit 211 may instruct a robot to transfer the cartridge 400 when a robot is used to move the cartridge 400 between the tape devices 100 and 100a.

The DDR memory unit 221 is a storage area for saving the unwritten data remaining in the buffer 130 of the tape device 100 when the server 200 is performing DDR processing. The DDR memory unit 221 may be implemented by using the storage area in the RAM 220.

FIG. 6 illustrates an example of a control table according to the second embodiment. A control table 421 is stored in the CM 420 by the drive command processing unit 114. The control table 421 includes a block identifier (BID) of the electromagnetic tape 410 when a writing failure occurs and the amount of unwritten data written to the CM 420.

The BID at a writing failure is an address of the electromagnetic tape 410 to which the tape recording unit 141 is performing writing when a failure occurs during the writing. The BID at the writing failure is assigned, for example, an area of four bytes in the CM 420.

The amount of unwritten data written to the CM 420 is the number of unwritten data records in the CM 420. The amount of unwritten data is assigned, for example, an area of two bytes following the areas assigned to the BIDs at writing failure.

An area of two bytes following the amount of unwritten data area is, for example, a spare area. A control table 421a depicts an example when the control table 421 is set with specific values. For example, information indicating "0x0000002" ("0x00", "0x00", "0x00", "0x02") is set as the BID at the time of the writing failure. This indicates that the writing failure occurred at the second block of the electromagnetic tape 410. That is, writing of the unwritten data is preferably started from that address (the second block). Information indicating "0x0003" ("0x00", "0x03") is set, for example, as the amount of unwritten data. This indicates that the number of unwritten data records stored (stored in the buffer 130 at the time of the writing failure) in the CM 420 is three.

Figure 7:
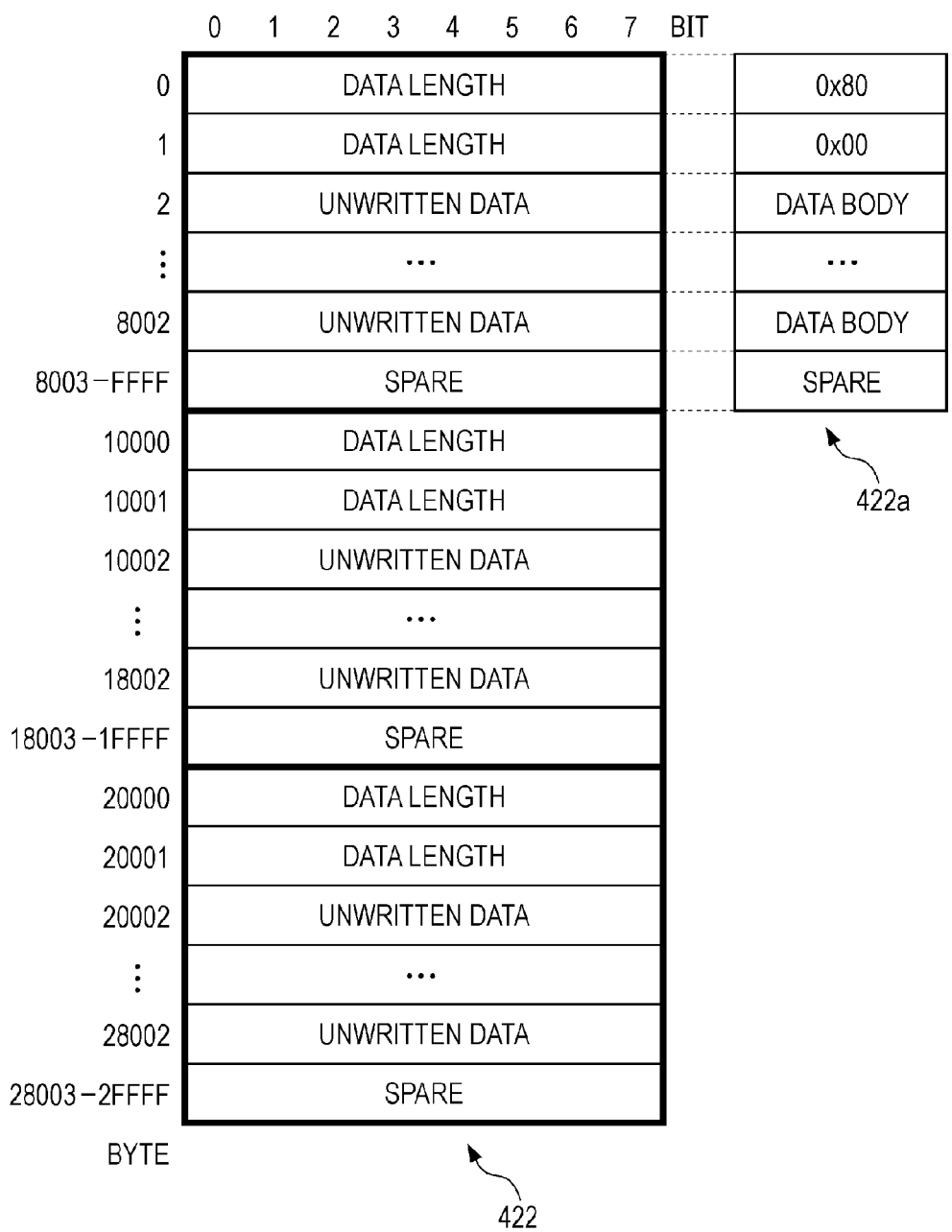
FIG. 7 illustrates an example of an unwritten data table according to the second embodiment.

FIG. 7 illustrates an example of an unwritten data table according to the second embodiment. An unwritten data table 422 is stored in the CM 420 by the drive command processing unit 114. The unwritten data table 422 is a table in which unwritten data is stored. An area of 65535 bytes is assigned to one unwritten data record.

The first two bytes of each area represent an area to set the data length. Areas other than the data length areas are areas for storing the body of the unwritten data. For example, the data length may be specified to a maximum of 32,768 bytes (32 kilobytes). When the data length is set to 32 KB, the body of the unwritten data is stored in a 32 KB-portion area following the first two bytes within the 65535-byte area. The remaining area is a spare area. The number of bytes illustrated in FIG. 7 is expressed as hexadecimal numbers.

An unwritten data table 422a represents an example when the head area of the unwritten data table 422 is set with specific values. For example, information indicating "0x8000" ("0x80", "0x00") is set for the data length. This indicates that the data length is 32 KB. In this case, the body of the unwritten data is stored from the second byte to the $32770^{th}$ byte (32 KB portion). The remaining area (32771 to 65535 bytes) is a spare area.

For example, when the maximum value of the amount of unwritten data in the control table 421 is set to 65535 so that 65535 records of unwritten data may be stored, a storage area of 65535 bytes multiplied by 65535 records equaling four GB may be used. A cartridge memory having a storage area that can only store the control table 421 and the unwritten data table 422 may be used as the CM 420.

The following is a description of processing for writing data on the electromagnetic tape 410 in the information processing system with the above configuration. In particular, it is assumed that a failure occurs in the tape recording unit 141 while writing data so that the writing fails. In this case, the tape device 100 stores the unwritten data in the CM 420 to be able to continue the writing of the failed data with the tape device 100a. This processing by the tape device 100 is considered pre-processing when an error occurs. The processing performed by the tape device 100a on the basis of the data stored in the CM 420 is considered post-processing when an error occurs.

Figure 8:
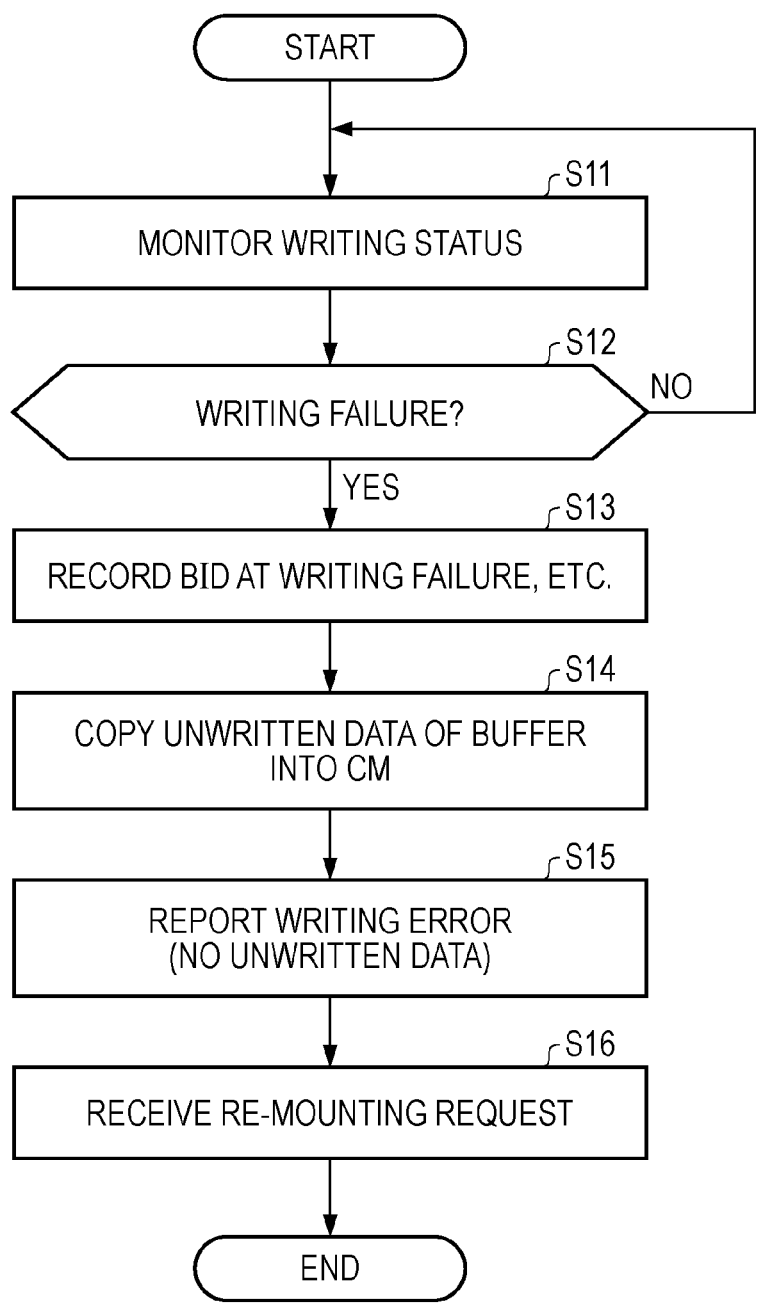
FIG. 8 is a flow chart illustrating an example of pre-processing when an error occurs according to the second embodiment.

FIG. 8 is a flow chart illustrating an example of pre-processing when an error occurs according to the second embodiment. The processing illustrated in FIG. 8 is explained with operation numbers. The cartridge 400 is accommodated in the drive 140 immediately before operation S11.

(Operation S11) the server command processing unit 112 stores data obtained from the server 200 in the buffer 130 (buffering). The drive command processing unit 114 uses the drive 140 to write the data stored in the buffer 130 on the electromagnetic tape 410. The buffer control unit 115 erases the data successfully written on the electromagnetic tape 410 from the buffer 130. The drive communication unit 113 monitors the state of the drive 140 during writing.

(Operation S12) The drive communication unit 113 determines whether writing failed due to the tape recording unit 141. If the writing has failed, the drive communication unit 113 notifies the drive command processing unit 114 about the error and the processing advances to operation S13. If there is no writing failure, the processing advances to operation S11 to continue monitoring.

(Operation S13) The drive command processing unit 114 notifies the server command processing unit 112 and the buffer control unit 115 about the error when the error notification is received from the drive communication unit 113. The drive command processing unit 114 obtains the electromagnetic tape BID at the time of the writing failure from the drive communication unit 113. The drive command processing unit 114 uses the memory recording unit 142 to record the BID in a certain area of the control table 421 stored in the CM 420. The drive command processing unit 114 also obtains the amount of unwritten data stored in the buffer 130 from the buffer control unit 115 in response to the error notification.

The drive command processing unit 114 then records the amount of unwritten data in a certain area of the control table 421.

(Operation S14) The drive command processing unit 114 obtains the unwritten data stored in the buffer 130 via the buffer control unit 115. The drive command processing unit 114 successively stores the unwritten data in the unwritten data table 422 stored in the CM 420. The drive command processing unit 114 stores the unwritten data and the data length of the unwritten data. The buffer control unit 115 erases the unwritten data saved to the CM 420 from the buffer 130.

(Operation S15) the server command processing unit 112 reports the writing error to the server 200 without performing buffering of the data when the next data writing command is received from the server 200 after the error notification has been received from the drive command processing unit 114. At this time, the server command processing unit 112 reports the writing error and the fact that there is no unwritten data. For example, by indicating the BID (Device BID: DEV BID) of the successful data writing in the tape device 100 with respect to the current BID (Channel BID: CHN BID) of the electromagnetic tape 410 managed by the server 200, the notification of the presence or absence of the unwritten data to the server 200 is performed. In this case, unwritten data is present if the DEV BID is smaller than the CHN BID. If unwritten data is present, the DDR processing unit 211 obtains from the tape device 100 data corresponding to an address range representing the difference between the CHN BID and the DEV BID. Conversely, there is no data if the CHN BID and the DEV BID match. For example, in operation S15, the server command processing unit 112 reports that the CHN BID and the DEV BID match to make the server 200 believe that there is no unwritten data.

(Operation S16) The DDR processing unit 211 transmits a re-mounting request to re-mount the tape device 100 when the writing error report is received from the tape device 100. The DDR processing unit 211 instructs an operator to move the cartridge 400 to the tape device 100a. Which tape device to move for the DDR is set beforehand in the DDR processing unit 211.

Here, the DDR processing unit 211 receives the report of the no unwritten data in operation S15 from the tape device 100. Consequently, the DDR processing unit 211 in this processing does not obtain the unwritten data from the tape device 100.

Next, states of the buffer 130, the electromagnetic tape 410, and the CM 420 in the operations explained in FIG. 8 is explained in detail.

Figure 9:
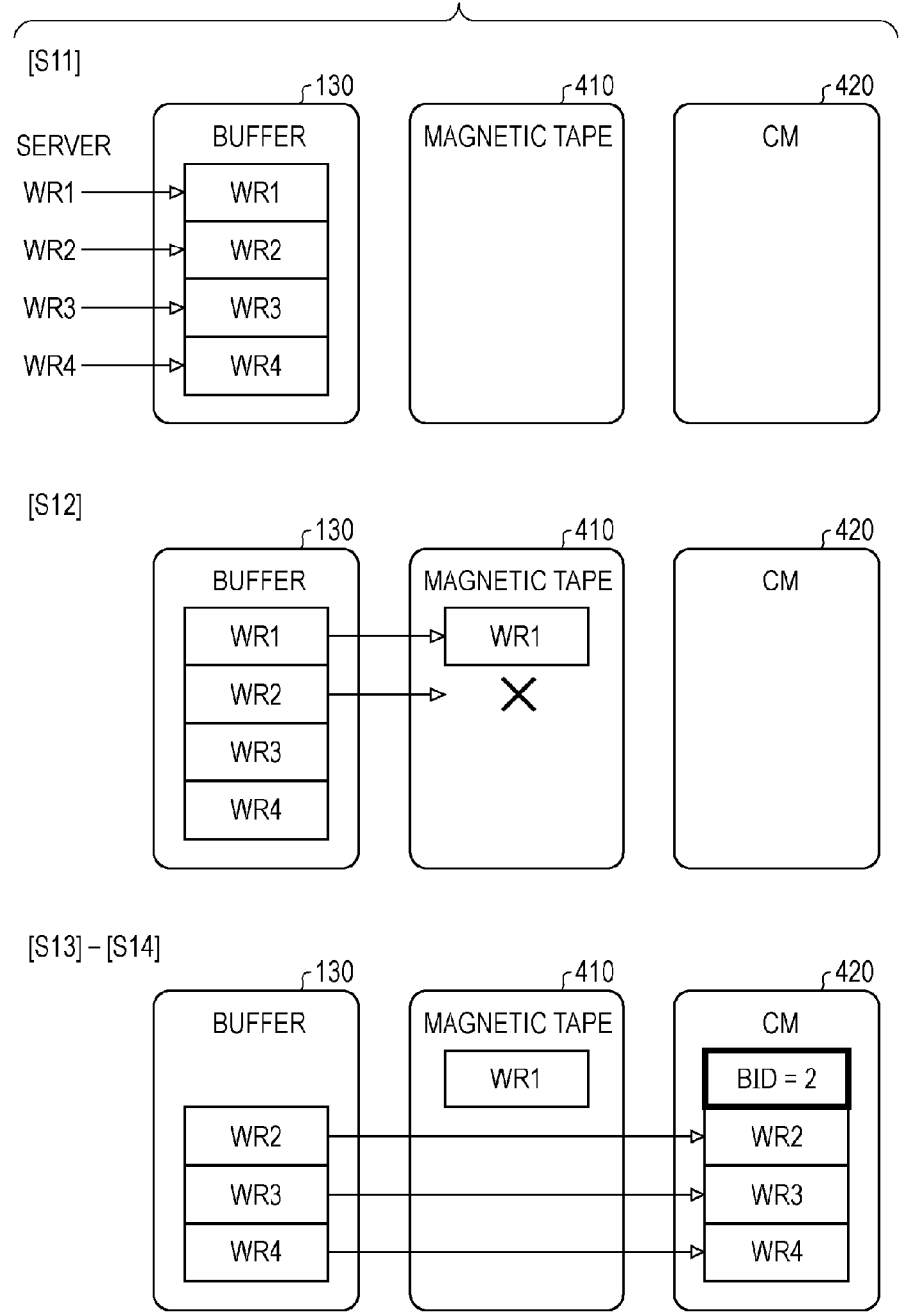
FIG. 9 illustrates a specific example of pre-processing when an error occurs according to the second embodiment.

FIG. 9 illustrates a specific example of pre-processing when an error occurs according to the second embodiment. The state of the buffers corresponds to the operations described in FIG. 8. When the data of the server 200 is written on the electromagnetic tape 410, a certain amount of data is obtained beforehand from the server 200 for buffering. As an example, four write commands (WRITE) are set as one unit of buffering. That is, the writing on the electromagnetic tape 410 is executed when the four write commands and the obtained data are buffered. First, the tape device 100 receives the four commands in succession. Then, the tape device 100 stores the write commands and four received unwritten data records WR1, WR2, WR3, and WR4 in the buffer 130 (operation S11). The tape device 100 sends a reply to the server 200 indicating that the writing was successful at the point in time that the unwritten data records are buffered. This is performed to send the reply to the server 200 early.

Next, the tape device 100 writes the unwritten data records WR1, WR2, WR3, and WR4 stored in the buffer 130 on the electromagnetic tape 410 in succession. The tape device 100 successfully writes the unwritten data record WR1. The tape device 100 erases the unwritten data record WR1 from the buffer 130. The tape device 100 fails to write the unwritten data record WR2 due to a failure of the tape recording unit 141 (operation S12).

The tape device 100 records the BID at writing failure in the control table 421 of the CM 420. Here, the example indicates that the BID at writing failure equals "2" (corresponding to the address to which the unwritten data record WR2 is written). Moreover, the tape device 100 writes the unwritten data records WR2, WR3, and WR4 stored in the buffer 130 in the unwritten data table 422 of the CM 420 in succession (unwritten data saving). The tape device 100 erases the unwritten data record from the buffer 130 after the saving is completed (operations S13 to S14).

Figure 10:
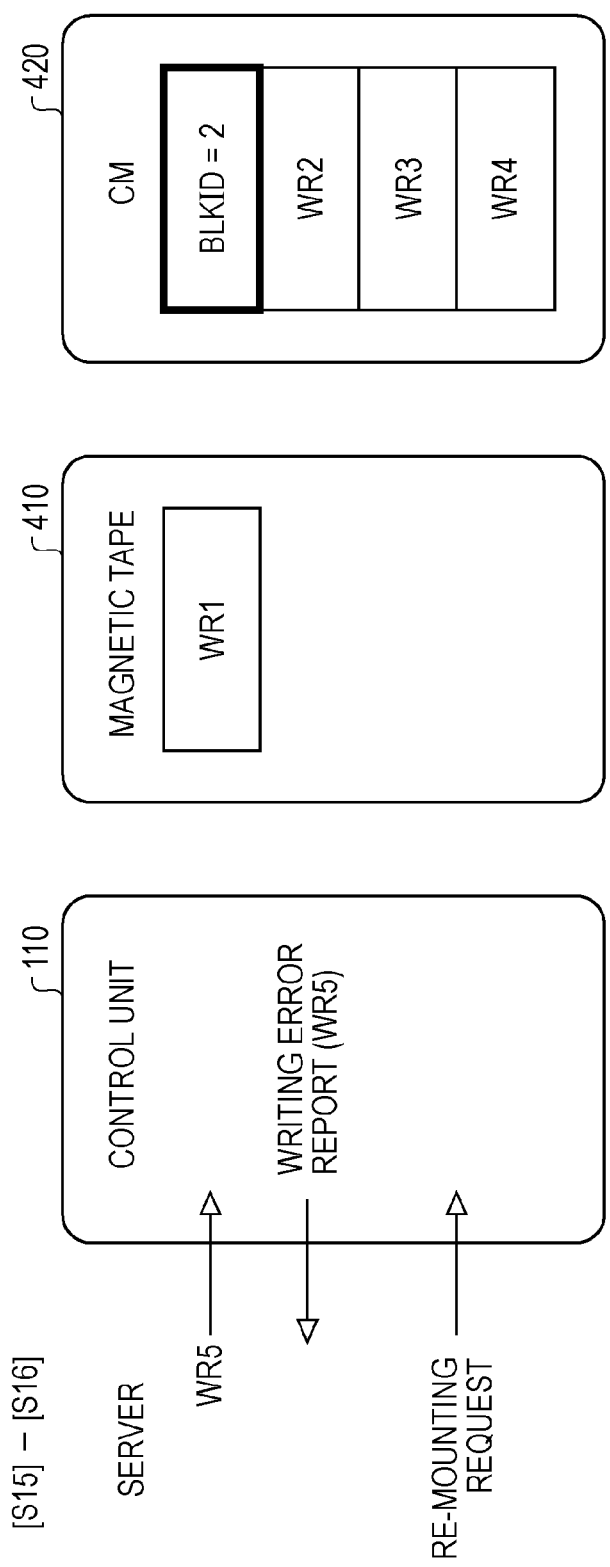
FIG. 10 illustrates a specific example (continued) of pre-processing when an error occurs according to the second embodiment.

FIG. 10 illustrates a specific example (continued) of preprocessing when an error occurs according to the second embodiment. The tape device 100 receives a fifth writing command (command to request writing of unwritten data record WR5) from the server 200. The tape device 100 reports a writing error with respect to the writing command. At this time, the tape device 100 reports the writing error and the fact that the unwritten data is not in the buffer 130. Specifically, it is assumed here that the BID of the block in which the unwritten data record WR5 is written is, for example, "5". In this case, the CHN BID managed by the server 200 is "5". Consequently, the tape device 100 reports that the DEV BID matches the CHN BID which equals "5" (corresponding at the address to which the data writing is preferably restarted by the server 200 using the tape device 100a). As a result, the server 200 is led to believe that there is no unwritten data.

The server 200 detects the failure of the writing of the unwritten data record WR5 in the tape device 100 from the report, but does not detect writing failures of the unwritten data records WR2, WR3, and WR4. As a result, the server 200 uses the other tape device 100a and determines that the writing of the presently requested unwritten data record WR5 is preferably restarted. Therefore, the server 200 does not obtain the unwritten data records WR2, WR3, and WR4 from the tape device 100. The server 200 then sends a request to the tape device 100 for performing re-mounting of the cartridge 400 to the tape device 100a. The server 200 also instructs an operator to move the cartridge 400 to the tape device 100a (operation S15 to S16).

The following is an explanation of the post-processing at the time of an error by the tape device 100a. Here, the tape device 100a has functions similar to the tape device 100 as described above. Hereinbelow, components of the tape device 100a are indicated with the same names as the components of the tape device 100.

Figure 11:
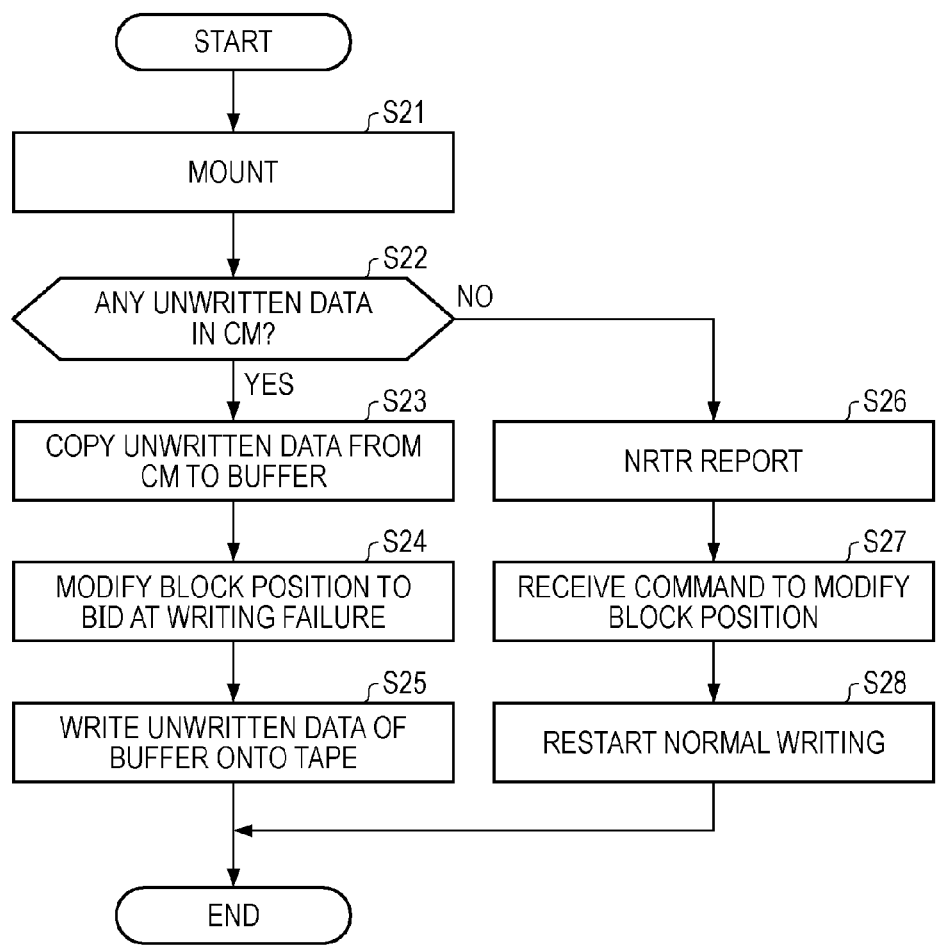
FIG. 11 is a flow chart illustrating an example of post-processing when an error occurs according to the second embodiment.

FIG. 11 is a flow chart illustrating an example of postprocessing when an error occurs according to the second embodiment. The processing illustrated in FIG. 11 is explained following operation numbers. (Operation S21) The cartridge 400 is moved to a drive of the tape device 100a by an operator. The tape device 100a then performs a cartridge 400 mounting process. In the following explanation, the description "tape device 100a" is omitted, but the units involved in the processing are included in the tape device 100a.

(Operation S22) The drive command processing unit determines whether unwritten data is in the CM 420. If unwritten data is present, the processing advances to operation S23. If unwritten data is not present, the processing advances to operation S26. For example, the drive command processing unit is able to determine the presence or absence of the unwritten data from the amount of unwritten data in the control table 421 stored in the CM 420. The presence of one or more record of unwritten data indicates that unwritten data is present. The amount of unwritten data being zero indicates that no unwritten data is present.

(Operation S23) The drive command processing unit reads the unwritten data from the unwritten data table 422 in the CM 420 and copies the unwritten data to the buffer. (Operation S24) The drive command processing unit refers to the BID at writing failure in the control table 421 and controls the data recording unit to modify the writing block position in the electromagnetic tape 410.

(Operation S25) The drive command processing unit writes the unwritten data stored in the buffer from the block position of the electromagnetic tape 410. The buffer control unit erases the unwritten data that has been written on the electromagnetic tape 410 from the buffer and the CM 420. The processing is then completed.

(Operation S26) The drive command processing unit reports that there is no unwritten data to the server command processing unit. Then, the server command processing unit reports a not-ready-to-read (NRTR) to the server 200. The NRTR report is a report for notifying the server 200 that the preparation to restart writing data to the electromagnetic tape 410 has been completed.

(Operation 27) The server command processing unit receives a command to modify the block position of the electromagnetic tape 410 from the server 200. The server command processing unit notifies the drive command processing unit about the command. The drive command controls the data recording unit to modify the writing block position in the electromagnetic tape 410 to the instructed block position.

(Operation S28) The server command processing unit receives the data to be written from the server 200 and performs buffering. The drive command processing unit restarts normal data writing from the block position.

In this way, the unwritten data saved to the CM 420 is added to the electromagnetic tape 410 by the tape device 100a. The following is a detailed explanation of the states of the buffer of the tape device 100a, the electromagnetic tape 410 and the CM 420 from the operations (however, only in the case of unwritten data present in the CM 420) described in FIG. 11. Hereinbelow, the buffer of the tape device 100a is indicated as a buffer 13a for convenience. The states of the electromagnetic tape 410 and the CM 420 when the cartridge 400 is moved to the tape device 100a are the same as the states illustrated in FIG. 10.

FIG. 12 illustrates a specific example of post-processing when an error occurs according to the second embodiment. The tape device 100a detects the presence of the unwritten data records WR2, WR3, and WR4 in the CM 420. The tape device 100a then copies the unwritten data records WR2, WR3, and WR4 stored in the CM 420 to the buffer 130a (operation S23).

The tape device 100a refers to the control table 421 in the CM 420 to obtain the BID at writing failure. Here the BID equals two. The tape device 100a modifies the writing block position in the electromagnetic tape 410 to "2". The tape device 100a successively adds the unwritten data records WR2, WR3, and WR4 stored in the buffer 130a from the block position after the modification. The tape device 100a erases the unwritten data that has been written on the electromagnetic tape 410 from the buffers and the CM 420.

Figure 13:
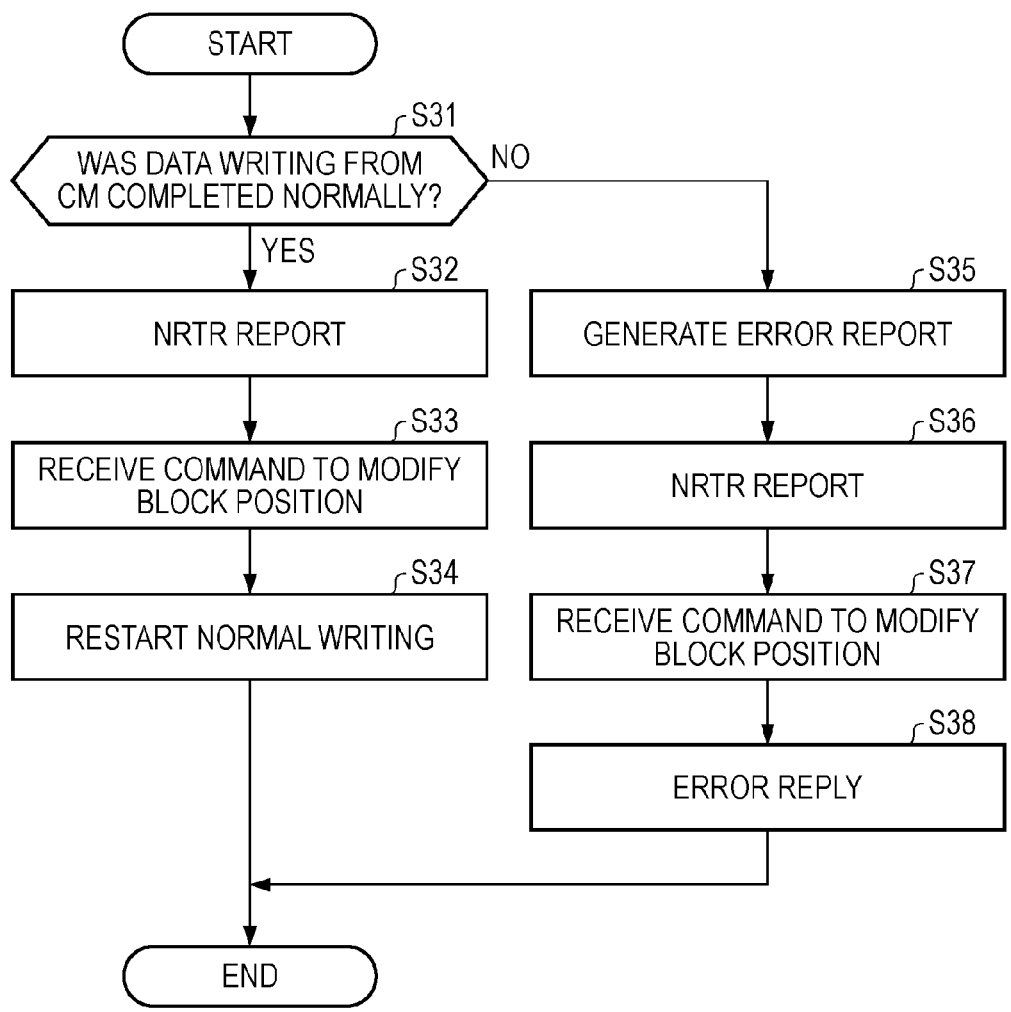
FIG. 13 is a flow chart illustrating an example of writing restart processing according to the second embodiment.

The tape device 100a reports an NRTR to the server 200 and restarts normal writing when all the unwritten data has been written on the electromagnetic tape 410. Next, this procedure is explained. FIG. 13 is a flow chart illustrating an example of writing restart processing according to the second embodiment. The processing illustrated in FIG. 13 is explained with operation numbers.

(Operation S31) The drive command processing unit determines whether the writing of the unwritten data stored in the CM 420 on the electromagnetic tape 410 has all been completed normally. If the writing has been completed normally, the processing advances to operation S32. If the writing has not been completed normally, the processing advances to operation S35.

(Operation S32) The drive command processing unit reports that the writing was completed normally to the server command processing unit. The server command processing unit reports the NRTR to the server 200. (Operation S33) The server command processing unit receives a command to modify the block position of the electromagnetic tape 410 from the server 200. The server command processing unit sends a reply to the server 200 indicating that the block position has been modified without processing the command (block position modification). Here, the reason that the block position modification is not performed is that the movement to the block position instructed by the server 200 was completed when operation S25 in FIG. 11 was finished. Specifically, in the example in FIG. 12, when the writing on the electromagnetic tape 410 of the unwritten data record WR4 (written at the block position corresponding to BID "4") stored in the buffer 130a is completed, the starting point for the next recording on the electromagnetic tape 410 becomes BID "5". Accordingly, the server 200 is aware that the BID at writing failure is "5" as explained in FIG. 10. Therefore, the server 200 issues the modification command to the tape device 100a to modify the BID to the BID "5" block position. Consequently, the tape device 100a may not perform the block position modification with respect to the command.

(Operation S34) The server command processing unit receives the data to be written from the server 200 and performs buffering. The drive command processing unit restarts normal data writing from the block position. The processing is then completed. Afterward, monitoring of the writing is performed for the tape device 100a (corresponding to operations S11 and S12 in FIG. 8).

(Operation S35) The drive command processing unit notifies the server command processing unit about the error. The server command processing unit generates an error report for reporting to the server 200. (operation S36) The drive command processing unit reports the NRTR to the server command processing unit.

(Operation S37) The server command processing unit receives a command to modify the block position of the electromagnetic tape 410 from the server 200. (Operation S38) The server command processing unit sends a reply to the server 200 about the error report generated in operation S35 with respect to the block position modification command.

In this way, the tape device 100a restarts normal writing on the electromagnetic tape 410 when the writing of the unwritten data from the CM 420 is completed. After operation S38, the server 200 sends a request to re-mount to the tape device 100a and instructs the operator to move the cartridge 400 to another tape device. If the cartridge 400 is re-mounted to another tape device, the other tape device performs the same processing as that of the tape device 100a as described in FIGS. 11 and 13. As a result, the unwritten data stored in the CM 420 is reliably written on the electromagnetic tape 410.

The above processing is compared below to an example when data is saved by the DDR memory unit 221 of the server 200. FIG. 14 is a comparative example of processing when a writing error occurs. FIG. 14 illustrates an example where DDR processing is performed using the DDR memory unit 221 provided in the server 200 without using the CM 420. When this type of processing is performed, for example, data is written on the electromagnetic tape 410 of a cartridge not provided with the CM 420.

First, the tape device 100 stores the four received unwritten data records WR1, WR2, WR3, and WR4 received from the server 200 in the buffer 130 (operation ST1). Next, the tape device 100 writes the unwritten data stored in the buffer 130 on the electromagnetic tape 410 in succession. The writing of the unwritten data record WR1 is successful. The tape device 100 fails to write the unwritten data record WR2 (operation ST2).

The tape device 100 reports the writing error to the server 200. The tape device 100 reports that the BID at writing failure is "2" when reporting the error to the server 200. The server 200 then instructs the tape device 100 to transmit the unwritten data record WR2 corresponding to the BID "2" and the subsequent unwritten data. The tape device 100 transmits the instructed unwritten data to the server 200 in succession. The server 200 stores and holds the unwritten data received from the tape device 100 in the DDR memory unit 221. However, the size of the storage area secured as the DDR memory unit 221 may be smaller than the total size of the unwritten data records WR2, WR3, and WR4. In this case, for example, the unwritten data records WR and WR3 may be saved, but the unwritten data record WR4 may not be able to be saved (operation ST3). Continuation of the DDR by the server 200 becomes difficult when unsaved unwritten data is present.

In particular, the DDR memory unit 221 may be realized using a certain storage area in the RAM 220. In this case, the size of the DDR memory unit 221 is assigned a fixed value (e.g., about 1 GB). Thus, it is conceivable to modify the DDR memory unit 221 to increase the size. However, the storage area of the RAM 220 may be assigned in a fixed manner with respect to other devices (e.g., the input device 12 or the output device 13 and the like). As a result, increasing the size of the DDR memory unit 221 may affect areas assigned to other devices and thus increasing the size may be difficult. Moreover, it may be difficult for the server 200 to perform an operation to increase the size by itself while operating.

On the other hand, for example, recording speeds and storage area sizes that may be used by the electromagnetic tape 410 are increasing every year in the new generations of LTO. As a result, the amount of data that is buffered on the tape device 100 side is increasing and thus there is an increased possibility that differences between the DDR memory unit 221 size and the amount of data to be buffered will grow. In particular, differences may occur when a tape device is newly introduced to an existing server.

Consequently, providing the CM 420 in the cartridge 400 and using the CM 420 as an area for saving is conceivable. In doing so, the storage area for saving the unwritten data may be easily expanded. However, in this case, there is a problem in considering how to incorporate the unwritten data saving and writing processing using the CM 420 into the series of existing DDR procedures performed by the server 200. For example, operating costs for remaking the DDR procedures become a problem. Moreover, it is difficult to perform operations for modifying DDR procedures while the server 200 is operating.

Accordingly, when a data writing failure occurs in the tape device 100 of the second embodiment, dummy information indicating that there is no unwritten data is transmitted to the server 200 even if unwritten data is remaining in the buffer 130. As a result, the server 200 is led to believe that there is no unwritten data. By doing so, the server 200 does not have to obtain the unwritten data. The tape device 100 then saves the unwritten data in the CM 420 instead of saving the unwritten data in the server 200.

Furthermore, the tape device 100*a* reports NRTR to the server 200 after the unwritten data stored in the CM 420 has been written to the electromagnetic tape 410. As a result, the server 200 may restart writing from the next occurrence of data that the server 200 is aware of.

In this way, the tape devices 100 and 100*a* are able to save unwritten data to the CM 420 and write the saved unwritten data on the electromagnetic tape 410 without affecting the existing DDR procedures in the server 200. As a result, expanding the size of the save area used in the CM 420 may be performed at a low cost in comparison to remaking the existing DDR procedures in the server 200.

Third Embodiment

Hereinbelow, a third embodiment is explained. The following explanation mainly discusses points that are different from the second embodiment and the explanation of points that are similar is omitted.

The second embodiment describes an example where all the unwritten data is stored in the CM 420. Conversely, the DDR memory unit 221 of the server 200 may be used in addition to the CM 420. If both storage areas are used, a larger storage area may be used as the save area. Thus, a function that allows the use of the DDR memory unit 221 in addition to the CM 420 is provided in the third embodiment.

The overall configuration of the information processing system according to the third embodiment is similar to the overall configuration of the information processing system according to the second embodiment illustrated in FIG. 2. Devices included in the information processing system of the third embodiment are indicated by using the same names and reference numerals as in the second embodiment. The hardware examples and software examples of the devices are the same as the hardware examples and software examples of the devices in the second embodiment as described in FIGS. 3 to 5. The configuration of the devices in the third embodiment is indicated by using the same names and reference numerals as in the second embodiment.

In the tape devices 100 and 100*a* of the third embodiment, portions of the pre-processing when an error occurs and the writing restart processing differ from the pre-processing and the post-processing when an error occurs and the writing restart processing described in the second embodiment. Thus, the pre-processing when an error occurs and the writing restart processing according to the third embodiment is described.

Figure 15:
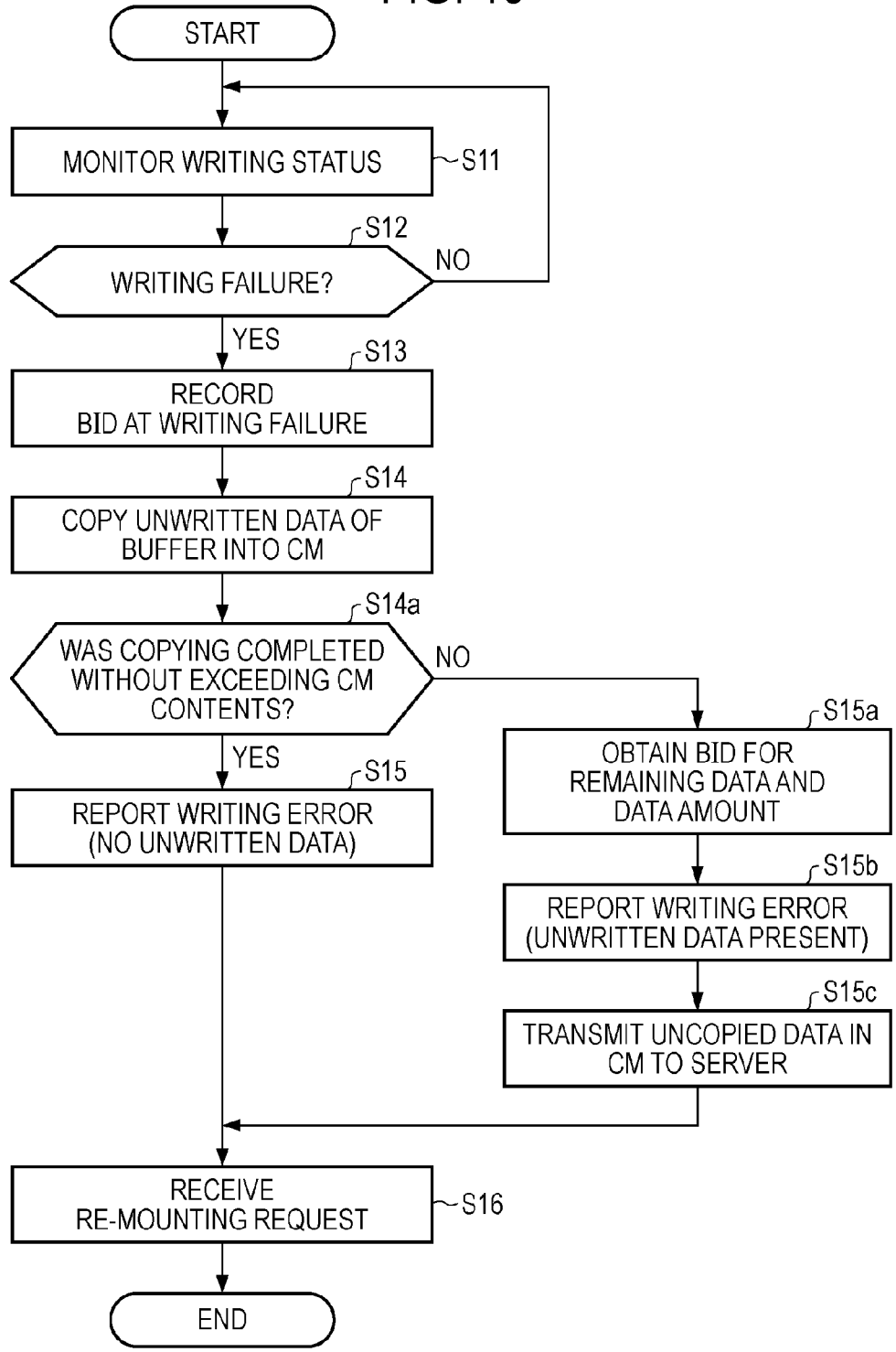
FIG. 15 is a flow chart illustrating an example of pre-processing when an error occurs according to a third embodiment.

FIG. 15 is a flow chart illustrating an example of pre-processing when an error occurs according to a third embodiment. The processing illustrated in FIG. 15 is explained with operation numbers. Here, operations S11 to S14, S15, and S16 are the same as the operations with the same reference numerals in FIG. 8. However, the advance from operation S14 to operation S14*a*, and the branching from operation S14*a* to operation S15 or to operation S15*a* are different. The operations that include these differences are described below, and the description of other operations is omitted.

(Operation S14*a*) The drive command processing unit 114 determines whether the copying of the unwritten data to the CM 420 was completed without exceeding the capacity of the CM 420. If writing was completed, the processing advances to operation S15. If the capacity of the CM 420 was exceeded and the copying of the unwritten data to the CM 420 was not completed, the processing advances to operation S15*a*.

(Operation S15*a*) The drive command processing unit 114 obtains the BID corresponding to the portion of unwritten data (referred to below as remaining data) not written to the CM 420 and the amount of all the remaining data. The drive command processing unit 114 notifies the server command processing unit 112 about the BID and the amount of data.

(Operation S15*b*) The server command processing unit 112 receives the information indicating the BID and the like from the drive command processing unit 114. The server command processing unit 112 reports the writing error to the server 200 without performing buffering of the data when the next data writing command is received from the server 200. At this time, the server command processing unit 112 reports the writing error and the fact that unwritten data is present. However, the server command processing unit 112 reports the remaining data that was not written to the CM 420 as unwritten data. Specifically, this is the BID (at the head of the remaining data) obtained from the drive command processing unit 114. The server command processing unit 112 reports the data amount of the remaining data to the server 200.

(Operation S15*c*) The server command processing unit 112 receives an instruction from the server 200 to transmit the remaining data. The server command processing unit 112 obtains the remaining data from the buffer 130 and transmits the remaining data. Then the processing advances to operation S16.

In this way, the server command processing unit 112 leads the server 200 to believe that the writing of the remaining data except for the unwritten data saved in the CM 420 was not performed. In this case, the server 200 determines that only the remaining data was saved to the DDR memory unit 221.

When the cartridge 400 is moved to the tape device 100*a*, the tape device 100*a* writes the unwritten data stored in the CM 420 on the electromagnetic tape 410 (post-processing when an error occurs described in FIG. 11).

Figure 16:
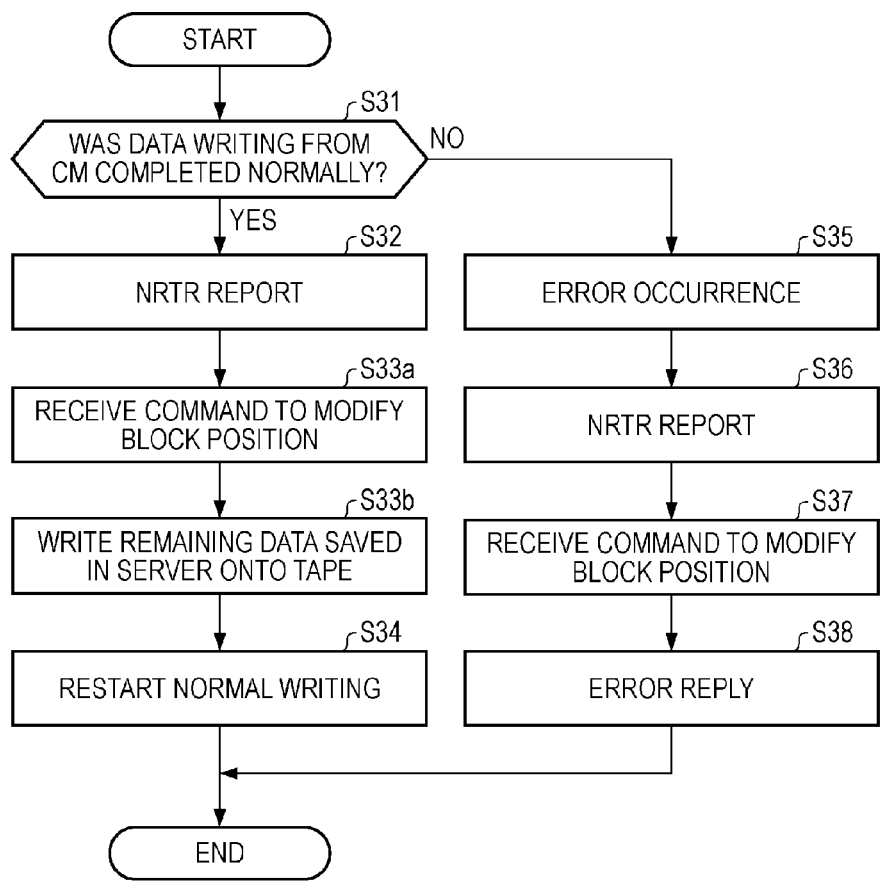
FIG. 16 is a flow chart of writing restart processing according to the third embodiment.

FIG. 16 is a flow chart illustrating an example of writing restart processing according to the third embodiment. The processing illustrated in FIG. 16 is explained with operation numbers. Here, operations S31 and S32 and operations S34 to S38 are the same as the operations with the same reference numerals in FIG. 13. However, there is a difference in that operations S33*a* and S33*b* are executed between the operations S32 and S34. The operations S33*a* and S33*b* that include these differences are described below, and the description of other operations is omitted.

(Operation S33*a*) A server command processing unit receives a command to modify the block position of the electromagnetic tape 410 from the server 200. This operation S33*a* differs from operation S33 in FIG. 13 in that the server 200 specifies, to the tape device 100*a*, the BID (block position) in the report received from the tape device 100 in operation S15*b*. The server command processing unit sends a reply to the server 200 indicating that the modification of the block position has been completed without processing the command (block position modification).

(Operation S33*b*) The server command processing unit receives the remaining data saved in the DDR memory unit 221 of the server 200 from the server 200. The server command processing unit performs buffering on the received remaining data. The drive command processing unit performs writing of the remaining data from the block position specified by the server 200. Then the processing advances to operation S34. Normal data writing restarts in operation S34 from the block position after the writing of the remaining data.

In this way, the remaining data saved to the DDR memory unit 221 of the server 200 is added to the electromagnetic tape 410 by the tape device 100a. The tape device 100a restarts normal writing on the electromagnetic tape 410 when the writing of the remaining data is completed. As a result, in addition to the CM 420, the DDR memory unit 221 may be used as an area for saving.

Fourth Embodiment

Hereinbelow, a fourth embodiment is explained. The following explanation mainly deals with points that are different from the second and third embodiments and points that are similar are omitted from the explanation.

In the second and third embodiments, the server 200 is kept away from obtaining all of the unwritten data by the tape devices 100 and 100a sending a dummy report to the server 200 regarding the presence or absence of unwritten data. Conversely, in reporting the fact that unwritten data is present to the server 200, dummy data that is smaller than the unwritten data may be transmitted to the server 200 instead of the unwritten data. In the fourth embodiment, a function is provided in which dummy data is transmitted to the server 200 in this way instead of the unwritten data.

The overall configuration of the information processing system according to the fourth embodiment is similar to the overall configuration of the information processing system according to the second embodiment illustrated in FIG. 2. Devices included in the information processing system of the fourth embodiment are indicated by using the same names and reference numerals as in the second embodiment. The hardware examples and software examples of the devices are the same as the hardware examples and software examples of the devices in the second embodiment as described in FIGS. 3 to 5. The configuration of the devices in the fourth embodiment is indicated by using the same names and reference numerals as in the second embodiment.

In the tape devices 100 and 100a of the fourth embodiment, portions of the pre-processing when an error occurs and the writing restart processing differ from the pre-processing and the post-processing when an error occurs and the writing restart processing described in the second embodiment. Thus, the pre-processing when an error occurs and the writing restart processing according to the fourth embodiment is described below.

Figure 17:
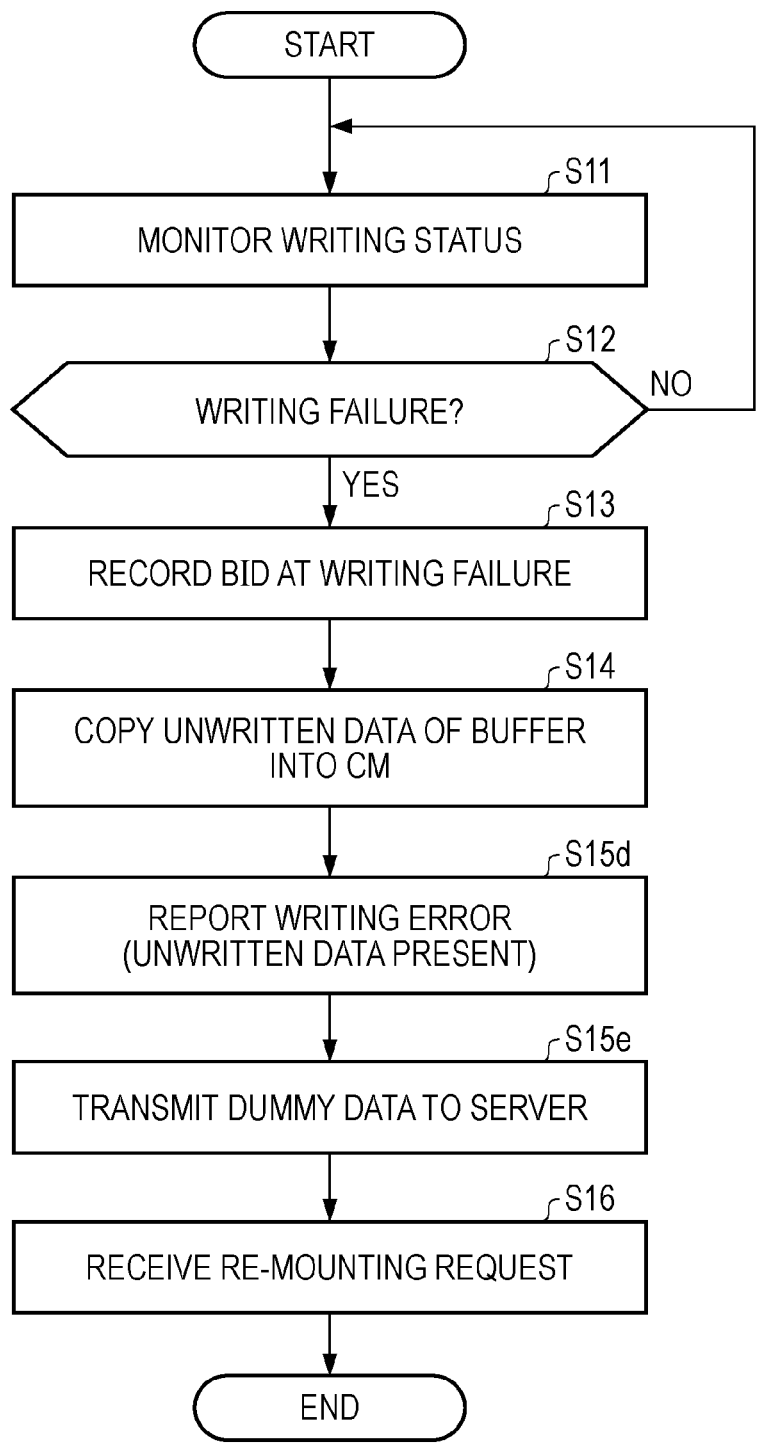
FIG. 17 is a flow chart illustrating an example of pre-processing when an error occurs according to a fourth embodiment.

FIG. 17 is a flow chart illustrating an example of pre-processing when an error occurs according to the fourth embodiment. The processing illustrated in FIG. 17 is explained with operation numbers. Here, operations S11 to S14, and S16 are the same as the operations with the same reference numerals in FIG. 8. However, there is a difference in that operations S15d and S15e are executed between the operations S14 and S16. The operations S15d and S15e that include these differences are described below, and the description of other operations are omitted.

(Operation S15d) The server command processing unit 112 reports the writing error to the server 200 without performing buffering of the data when the next data writing command is received from the server 200 after the error has been received from the drive command processing unit 114. At this time, the server command processing unit 112 reports the writing error and the fact that unwritten data is present. Specifically, using the examples in FIGS. 9 and 10, when a failure occurs in the writing of the unwritten data record WR2, a reply is sent to the server 200 indicating that the BID corresponding to the unwritten data record WR2 is "2". The server 200 then determines that the unwritten data is preferably added from the block position indicated by the BID "2".

(Operation S15e) The server command processing unit 112 receives an instruction from the server 200 to transmit the remaining data stored in the buffer 130. The server command processing unit 112 transmits dummy data that is smaller in size than the unwritten data to the server 200 instead of transmitting the unwritten data to the server 200. Then the processing advances to operation S16.

In this way, the tape device 100 sends the dummy data as a reply to the server 200 when the instruction to transmit the unwritten data is received from the server 200 after the unwritten data has been stored in the CM 420. Then, when the cartridge 400 is moved to the tape device 100a, the tape device 100a writes the unwritten data stored in the CM 420 on the electromagnetic tape 410 (post-processing when an error occurs described in FIG. 11).

Figure 18:
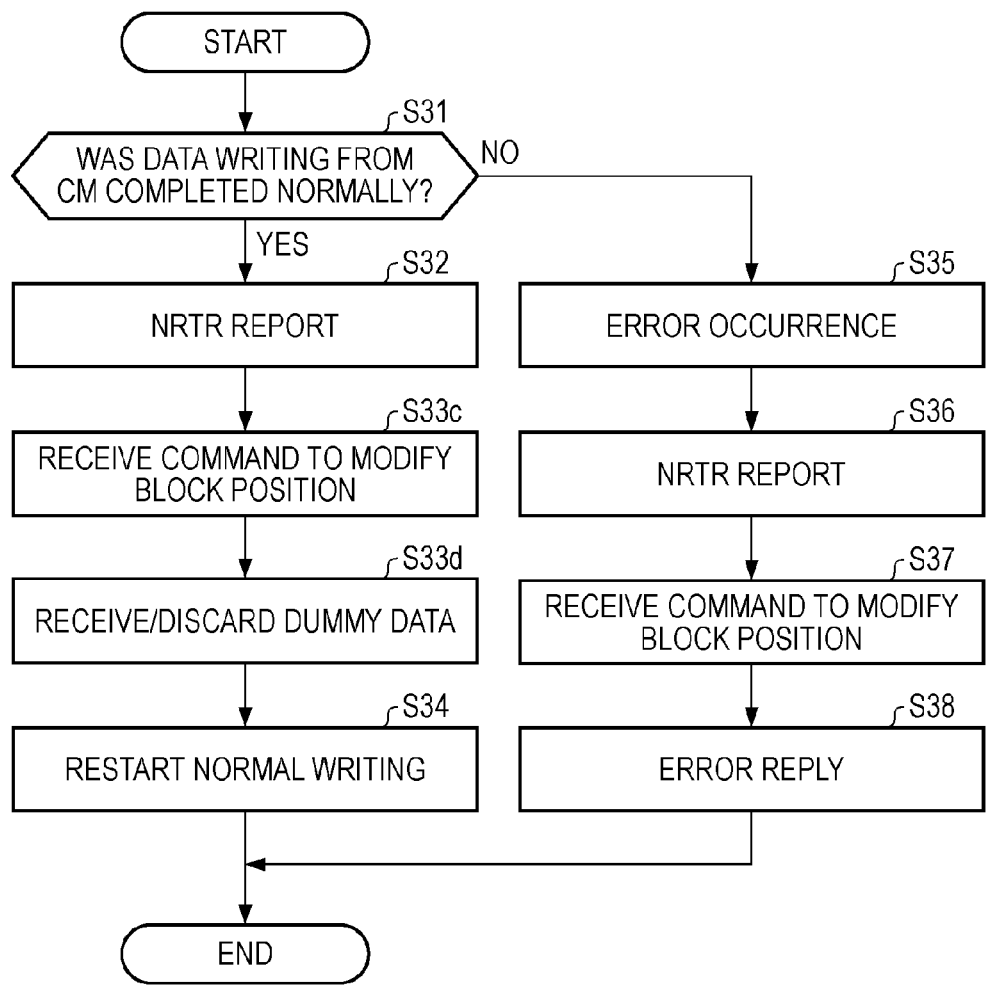
FIG. 18 is a flow chart illustrating an example of writing restart processing according to the fourth embodiment.

FIG. 18 is a flow chart illustrating an example of writing restart processing according to the fourth embodiment. The processing illustrated in FIG. 18 is explained with operation numbers. Here, operations S31 and S32 and operations S34 to S38 are the same as the operations with the same reference numerals in FIG. 13. However, there is a difference in that operations S33c and S33d are executed between the operations S32 and S34. The operations S33c and S33d that include these differences will be described below, and the description of other operations is omitted.

(Operation S33c) A server command processing unit receives a command to modify the block position of the electromagnetic tape 410 from the server 200. This operation S33c differs from operation S33 in FIG. 13 in that the server 200 specifies, to the tape device 100a, the BID (block position) from the report received from the tape device 100 in operation S15d. The server command processing unit sends a reply to the server 200 indicating that the modification of the block position has been completed without processing the command (block position modification).

(Operation S33d) The server command processing unit receives dummy data and the writing command from the server 200. The server command processing unit discards the received dummy data. The server command processing unit sends a reply to the server 200 indicating that the writing with respect to the command has been completed. Then the processing advances to operation S34.

In this way, the tape device 100a discards the dummy data even though the writing command and the dummy data were received from the server 200. The tape device 100a then sends a reply to the server 200 indicating that the writing is completed without performing the writing process. With this method, the CM 420 may be used as a storage area for saving data without modifying the existing DDR procedures in the server 200. As a result, the storage area for saving data may be expanded at a low cost.

Fifth Embodiment

Hereinbelow, a fifth embodiment is explained. The following explanation mainly discusses points that are different from the second to fourth embodiments and points that are similar are omitted from the explanation.

Examples in which the tape devices 100 and 100a were used to continue writing when unwritten data was generated were described in the second to fourth embodiments. Conversely, writing may also be continued by changing the drive that contains the cartridge 400 in the tape device when one tape device has a plurality of drives. Thus, a tape device is provided for the above in the fifth embodiment.

The overall configuration of the information processing system according to the fifth embodiment is similar to the overall configuration of the information processing system according to the second embodiment illustrated in FIG. 2. The fifth embodiment however is different in that a tape device 100b is provided in place of the tape device 100. The components included in the information processing system according to the fifth embodiment (other than the tape device 100b) are indicated with the same names and reference numerals as those of the second embodiment.

Figure 19:
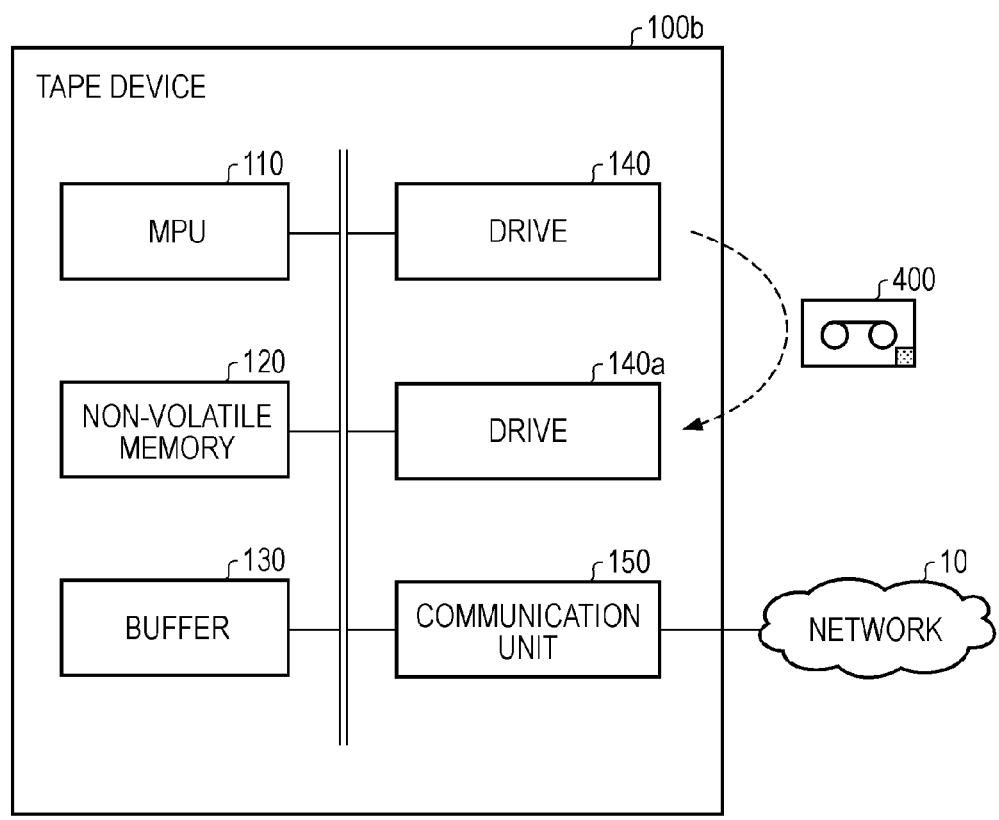
FIG. 19 is an example of hardware of a tape device according to a fifth embodiment.

FIG. 19 is an example of hardware of a tape device according to a fifth embodiment. The tape device 100b includes an MPU 110, a non-volatile memory 120, a buffer 130, a drive 140, a drive 140a, and a communication unit 150. The units are connected to a bus in the tape device 100. The MPU 110, the non-volatile memory 120, the buffer 130, the drive 140, and the communication unit 150 are similar to the components of the tape device 100 described in FIG. 3 and thus explanations thereof are omitted.

The drive 140a is able to accommodate the cartridge 400. The drive 140a is able to read data from and write data to the accommodated cartridge 400 according to commands from the MPU 110. The drive 140a has a tape recording unit and a memory recording unit similar to the drive 140. The tape recording unit reads data from and writes data on the electromagnetic tape 410. The memory recording unit reads data from and writes data to the CM 420.

The software example of the tape device 100b is similar to the software example of the tape device 100 described in FIG. 5. However, the tape device 100b is different in that the drive communication unit 113 is able to communicate with both the drive 140 and the drive 140a. The MPU 110 uses either of the drive 140 or the drive 140a to perform data writing on the electromagnetic tape 410.

In the fifth embodiment, when for example a breakdown occurs in the tape recording unit 141 that causes a failure in writing data on the electromagnetic tape 410 of the drive 140, the memory recording unit 142 saves the unwritten data and information such as the BID at writing failure stored in the buffer 130 to the CM 420. When the cartridge 400 is then moved to the drive 140a, the drive 140a adds the unwritten data saved to the CM 420 to the electromagnetic tape 410.

In this way, saving unwritten data to the CM 420 and writing the unwritten data saved to the CM 420 on the electromagnetic tape 410 may be performed in the tape device 100b having a plurality of drives. The tape device 100b transmits the dummy information to the server 200 when saving the unwritten data to the CM 420 in the same way as described in the second to fourth embodiments so that the unwritten data is not obtained by the server 200. "The unwritten data is not obtained by the server 200" includes at least a portion of the unwritten data not being obtained. As a result, the amount of data saved to the server 200 may be reduced. Moreover, modifications of the existing DDR procedures in the server 200 are not used and the save area may be expanded at a low cost using the CM 420.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A writing system, comprising:
a first writing device and a second writing device;
an information processor apparatus that is connected to the first writing device and the second writing device;
a cartridge that is accommodated in the first writing device, the cartridge including a recording medium and a memory unit, wherein
the first writing device comprises:
   a first writing unit that writes data on the recording medium and, when unwritten data is generated while writing the data on the recording medium, writes the unwritten data to the memory unit, and further transmits, to the information processor apparatus, dummy information for inhibiting the unwritten data to be obtained by the information processor apparatus,
the second writing device comprises:
   a second writing unit that writes, on the recording medium, the unwritten data written to the memory unit after the cartridge is moved from being accommodated in the first writing device to being accommodated in the second writing device, and
when the information processor apparatus receives the dummy information from the first writing unit, the information processor apparatus outputs an instruction for moving the cartridge from the first writing device to the second writing device.

2. The writing system according to claim 1, wherein the first writing unit transmits, as the dummy information to the information processor apparatus, a notification indicating that no unwritten data was written to the memory unit.

3. The writing system according to claim 1, wherein the first writing unit first transmits a notification indicating that unwritten data has been written to the memory unit, and then transmits a small amount of data that is smaller in size than the unwritten data to the information processor apparatus as the dummy information.

4. The writing system according to claim 1, wherein the first writing unit stores, in the memory unit, a first address of the recording medium for the second writing device to start writing of the unwritten data, and reports to the information processor apparatus a second address, that differs from the first address, as an address for the information processor apparatus to use the second writing device to start writing data on the recording medium.

5. The writing system according to claim 1, wherein the first writing unit causes the information processor apparatus to obtain remaining data among the unwritten data when the remaining data is not able to be written to the memory unit; and
the second writing unit writes a portion of the unwritten data stored in the memory unit and the remaining data held by the information processor apparatus on the recording medium.

6. A writing device that is used for writing data on a recording medium by an information processor apparatus that is connected to the writing device and another writing device, the writing device comprising:
a cartridge that is accommodated in the writing device and that includes the recording medium and a memory unit; and
a first writing unit that writes data on the recording medium and, when unwritten data is generated while writing the data on the recording medium, writes the unwritten data to the memory unit, and further transmits, to the information processor apparatus, dummy information for inhibiting the unwritten data to be obtained by the information processor apparatus; and a second writing unit that writes, on the recording medium, the unwritten data written to the memory unit after the cartridge is moved from being accommodated in the writing device to being accommodated in the other writing device, wherein when the information processor apparatus receives the dummy information from the writing unit, the information processor apparatus outputs an instruction for moving the cartridge from the writing device to the other writing device.

7. A writing method that executes a writing system that includes a first writing device and a second writing device that are connected to an information processor apparatus, the first writing device including a cartridge accommodated therein, the cartridge including a recording medium and a memory unit, the method comprising:

writing, by the first writing device, data on the recording medium and, when unwritten data is generated while writing the data on the recording medium, writing the unwritten data to the memory unit, and further transmitting, to the information processor apparatus, dummy information for inhibiting the unwritten data to be obtained by the information processor apparatus;

writing, by the second writing device, on the recording medium, the unwritten data written to the memory unit after the cartridge is moved from being accommodated in the first writing device to being accommodated in the second writing device; and when the information processor apparatus receives the dummy information from the first writing device, outputting, by the information processor apparatus, an instruction for moving the cartridge from the first writing device to the second writing device.

8. A writing method that is executed by a first writing device that is used for writing data on a recording medium by an information processor apparatus and a second writing device, the information processor apparatus being connected to the first writing device and the second writing device, the first writing device including a first writing unit and the second writing device including a second writing unit, the method comprising:

accommodating a cartridge in the first writing device, the cartridge including the recording medium and a memory unit;

writing, by the first writing unit, data on the recording medium and, when unwritten data is generated while writing the data on the recording medium, writing the unwritten data to the memory unit, and further transmitting, to the information processor apparatus, dummy information for inhibiting the unwritten data to be obtained by the information processor apparatus; and writing, by the second writing unit, on the recording medium, the unwritten data written to the memory unit after the cartridge is moved from being accommodated in the first writing device to being accommodated in the second writing device, wherein when the information processor apparatus receives the dummy information from the first writing device, the information processor apparatus outputs an instruction for moving the cartridge from the first writing device to the second writing device.

* * * * *